US011221990B2

(12) United States Patent
Taylor, Jr. et al.

(10) Patent No.: US 11,221,990 B2
(45) Date of Patent: Jan. 11, 2022

(54) ULTRA-HIGH COMPRESSION OF IMAGES BASED ON DEEP LEARNING

(71) Applicant: The MITRE Corporation, McLean, VA (US)

(72) Inventors: Robert M. Taylor, Jr., New Market, MD (US); Burhan Necioglu, Leesburg, VA (US)

(73) Assignee: The MITRE Corporation, McLean, VA (US)

( * ) Notice: Subject to any disclaimer, the term of this patent is extended or adjusted under 35 U.S.C. 154(b) by 777 days.

(21) Appl. No.: 14/678,532

(22) Filed: Apr. 3, 2015

(65) Prior Publication Data

US 2016/0292589 A1 Oct. 6, 2016

(51) Int. Cl.
*G06F 16/174* (2019.01)
*G06N 3/04* (2006.01)
*G06T 9/00* (2006.01)

(52) U.S. Cl.
CPC ....... *G06F 16/1744* (2019.01); *G06N 3/0454* (2013.01); *G06N 3/0472* (2013.01); *G06T 9/002* (2013.01)

(58) Field of Classification Search
CPC ............ G06F 17/30153; G06N 3/0454; G06N 3/0472; G06T 9/002
USPC .......................................................... 706/12
See application file for complete search history.

(56) References Cited

U.S. PATENT DOCUMENTS

| | | | |
|---|---|---|---|
| 5,764,860 A | 7/1998 | Yatsuzuka | |
| 5,812,700 A | 9/1998 | Fang et al. | |
| 5,870,728 A | 2/1999 | Yatsuzuka et al. | |
| 6,424,737 B1 | 7/2002 | Rising, III | |
| 6,633,677 B1 * | 10/2003 | Dube | G06T 9/004 382/236 |
| 6,976,012 B1 | 12/2005 | Rising, III | |
| 7,636,651 B2 | 12/2009 | Bishop et al. | |
| 8,805,105 B2 | 8/2014 | Takamori et al. | |

(Continued)

FOREIGN PATENT DOCUMENTS

| | | |
|---|---|---|
| CN | 103530657 | 1/2014 |
| EP | 1 511 323 | 3/2005 |

OTHER PUBLICATIONS

Kainen et al., "Continuity of Approximation by Neural Networks", Annals of Operations Research 101, 143-147, 2001.*

(Continued)

*Primary Examiner* — Tsu-Chang Lee
(74) *Attorney, Agent, or Firm* — Morrison & Foerster LLP

(57) ABSTRACT

A system for machine learning model parameters for image compression, including partitioning image files into a first set of regions, determining a first set of machine learned model parameters based on the regions, the first set of machine learned model parameters representing a first level of patterns in the image files, constructing a representation of each of the regions based on the first set of machine learned model parameters, constructing representations of the image files by combining the representations of the regions in the first set of regions, partitioning the representations of the image files into a second set of regions, and determining a second set of machine learned model parameters based on the second set of regions, the second set of machine learned model parameters representing a second level of patterns in the image files.

22 Claims, 16 Drawing Sheets

(56) References Cited

U.S. PATENT DOCUMENTS

| | | | |
|---|---|---|---|
| 2005/0131660 | A1 | 6/2005 | Yadegar et al. |
| 2005/0213655 | A1 | 9/2005 | Thoreau et al. |
| 2008/0281767 | A1 | 11/2008 | Garner |
| 2009/0169075 | A1 | 7/2009 | Ishida et al. |
| 2011/0090950 | A1 | 4/2011 | Bush et al. |
| 2012/0169842 | A1* | 7/2012 | Chuang ............ G08B 13/19619 348/39 |
| 2014/0009574 | A1 | 1/2014 | Hannuksela et al. |
| 2014/0132429 | A1 | 5/2014 | Scoville |
| 2014/0219078 | A1 | 8/2014 | Dasgupta et al. |
| 2014/0222731 | A1 | 8/2014 | Mermoud et al. |
| 2015/0055855 | A1* | 2/2015 | Rodriguez ............ G06F 21/16 382/159 |
| 2015/0093045 | A1* | 4/2015 | Turkan .................. G06T 3/4053 382/299 |

OTHER PUBLICATIONS

Chen et al., "Compressive Sensing on Manifolds Using a Nonparametric Mixture of Factor Analyzers: Algorithm and Performance Bounds", IEEE Transactions on Signal Processing, vol. 58, No. 12, Dec. 2010.*

Robinson, et al., "Combining Support Vector Machine Learning With the Discrete Cosine Transform in Image Compression", IEEE Transactions on Neural Networks, vol. 14, No. 4, Jul. 2003 (Year: 2003).*

Bryt et al., "Compression of facial images using the K-SVD algorithm", Journal of Visual Communication and Image Representation, vol. 19, Issue 4, May 2008, pp. 270-282 (Year: 2008).*

Carreira-Perpiñán, M. (Jan. 1997). "A Review of Dimension Reduction Techniques," *Technical Report CS-96-09*, Department of Computer Science, University of Sheffield; 69 pages.

Davies, S. (May 2002). "Fast Factored Density Estimation and Compression with Bayesian Networks," *UMI Dissertations Publishing*, Carnegie Mellon University; 195 pages.

Jing. L. et al. (2012). "The Design of Image Compression with BP Neural Network Based on the Dynamic Adjusting Hidden Layer Nodes," *Advanced Materials Research*, vols. 433-440: 3797-3801.

Salakhutdinov, R. et al. (2013). "Learning with Hierarchical-Deep Models," *Pattern Analysis and Machine Intelligence*, No. 8: 1958-1971.

Taylor, Jr., R. et al. "Ultra-high Compression of Images Based on Deep Learning," *Proceedings of the 31$^{st}$ International Conference on Machine Learning*, 2014, Beijing, China; 5 pages.

Teh, Y. et al. (2010). "Dirichlet Process," *Encyclopedia of Machine Learning*, pp. 280-287.

Watta, P. et al. (1995). "Experiments in Machine Learning Using Artificial Neural Networks for Control and Image Compression," *Computer Applications in Engineering Education*, 3(3): 195-204.

Yang, H. "Learning Based Screen Image Compression," *IEEE 14$^{th}$ International Workshop*, Sep. 17-19, 2012, Banff, AB; 6 pages.

Yuan, X. et al. (2014). "Hierarchical Infinite Divisibility for Multiscale Shrinkage," located at <http://www.ece.duke.edu/~lcarin/hierarchical_shrinkage.pdf>. (12 pages).

* cited by examiner

A. ORIGINAL IMAGE

B. WITH 10:1 COMPRESSION

C. WITH 45:1 COMPRESSION

ORIGINAL IMAGE                DLC CR=456:1

ULTRA-HIGH COMPRESSION OF IMAGES BASED ON DEEP LEARNING

FIELD OF THE INVENTION

The present disclosure relates generally to image processing, and more specifically to improved image compression based on machine learning.

BACKGROUND OF THE INVENTION

Digital images may be transmitted, stored, and displayed using 2-dimensional arrays of data in the form of digital image files. Digital image files require substantial amounts of digital storage capacity and large transmission bandwidths to store and transmit from computing device to computing device. Compression techniques have been designed to reduce this data volume, while minimizing the amount of distortion that results from the compression-decompression process. Such compression techniques are generally based on redundancies in information content of the data and on the limits of the human eye and brain to detect high frequency changes in brightness over an image area.

The data structure of a digital image file, which is used to render the image on a display, consists of an array of values representing "pixel" intensities. A pixel is the smallest controllable element of an image represented on a display, and the intensity is the value that pixel takes when used to display the image. For example, in a grayscale image, a pixel value represents the relative lightness of that point of the image. A representation of a digital image file is shown in FIG. 1. The partial face image consists of a 168 by 168 array of pixel intensities. Several 8 by 8 blocks, or regions, of the array are expanded to illustrate that each pixel is represented by a number. In this case, each pixel intensity is represented by a byte of digital data (therefore, the intensities range from 0 to 255). The image of FIG. 1, then, contains 168×168=28,244 bytes of data (28 kilobytes). The goal of image compression techniques, generally, is to transform the original grid of image pixels into a new, much smaller set of digital values holding the information needed to regenerate the original image. In other words, to reduce the file size of FIG. 1 to something less than 28 kilobytes.

Compressing digital image files helps reduce the amount of resource usage for storing and transmitting the digital images. With the increasing quantity of digital images being captured, stored, and transferred at ever higher resolutions, the computing resources required to handle these images is ever increasing. Reducing the amount of data required to handle these images, through digital image compression, allows computing devices to be made with less physical memory, enabling them to be made smaller and cheaper. Existing devices are able to store even more digital images reducing the requirement for a user to delete images to make room for new images or to acquire additional digital storage space that may be expensive and take up limited space in the computing device. Additionally, less data needs to be transmitted when transferring compressed images between computing devices, which enables faster transmission times and creates less of a load on the network used to transmit the compressed images. Thus, compression of digital images is important in making computing devices smaller and cheaper and in increasing the usability of computing devices for sharing digital images.

There are a variety of approaches to the problem of image compression, which may be classified by virtue of their predominant encoding algorithms, such as, for example, predictive coding, transform coding, statistical coding and interpolation coding. Contemporary image compression systems often utilize a combination of coding techniques tailored to the characteristics of the image. For example, the Joint Photographic Experts Group (JPEG) standard utilizes Discrete Cosine Transform (DCT) and Huffman statistical coding, among others.

Conventional image compression techniques are generally referred to as being either "lossless" or "lossy", depending upon whether data is discarded in the compression process. Examples of conventional lossless compression techniques include Huffman encoding, arithmetic encoding, and Fano-Shannon encoding. With a lossless compression, the decompression process will reproduce all bits of the original image and there will be no distortion caused by the compression process. However, lossless compression is limited to compression ratios generally below 8:1. Lossy compression, in contrast, provides greater efficiency over lossless compression in terms of speed and storage because some of the data in the original image file is discarded. As a result, lossy techniques are employed where some degree of inaccuracy relative to the input data is tolerable. JPEG is an example of a lossy compression method. The amount of compression achievable by convention lossy compression techniques depends on the acceptable level of image degradation. Generally, a 10:1 compression ratio based on the JPEG standard results in almost no perceptible degradation, whereas a 100:1 compression ratio results in significant distortion.

Many conventional image compression techniques, such as JPEG, transform an image into the frequency domain and then quantize and/or truncate the number of bits used to sample the higher frequency components. This step is typically followed by entropy encoding of the frequency coefficients. JPEG uses a discrete cosine transform (DCT), a relative of the Fourier transform, on 8×8 pixel blocks to transform the image into the frequency domain, while wavelet techniques use more sophisticated methods on larger areas of pixels. Transform compression is based on the premise that when the data contained in a pixel block (often called a signal) is passed through the Fourier (or other) transform, the resulting data values will no longer be equal in their information carrying roles. The low frequency components of a signal will be more important than the high frequency components. Removing 50% of the bits from the high frequency components might remove, say, only 5% of the information. This removing of bits results in a compressed image file that contains less data than the original image.

As shown in FIG. 1, JPEG compression starts by breaking an image into 8×8 pixel groups. In this example, each pixel is a single byte, a grayscale value between 0 and 255. These 8×8 pixel groups are treated independently during compression. That is, each group is represented by 64 bytes. After transforming and removing data, each group is represented by, for example, 2 to 20 bytes. During decompression, the inverse transform is taken of the 2 to 20 bytes to create an approximation of the original 8×8 group. These approximated groups are then fitted together to form the uncompressed image.

The amount of compression, and the resulting loss of image quality, can be selected in a typical JPEG compression program. FIGS. 2A-C illustrates image degradation resulting from high compression ratios. The reconstructed image resulting from 10:1 compression, shown in FIG. 2B, shows some degradation though not severe. However, the reconstructed image resulting from 45:1 compression ratio, shown in FIG. 2C, is significantly degraded.

As demonstrated, conventional image compression methods, such as JPEG, are limited in the level of compression by the tolerable amount of image distortion. At the 45:1 compression of FIG. 2C, the image is distorted to a level that may be unacceptable to a viewer. Furthermore, with the increasing amount of digital image data being captured, stored, and transferred from device to device, even compression ratios in the range of 45:1 are increasingly inadequate to reduce this amount of digital image data needed to store and transfer image files. Therefore, there is a need for an image compression method that can produce compression ratios that exceed conventional methods without resulting in unacceptable levels of degradation.

SUMMARY OF THE INVENTION

Described herein are methods, systems, and devices for compressing digital image files to levels that exceed conventional compression methods without resulting in severe image degradation. Conventional image compression techniques such as JPEG are generally based on the observations that adjacent pixels in an array of pixels representing an image are likely to be similar and that the human eye and brain have difficulty detecting high frequency changes in pixel intensities over a given area. Conventional compression techniques utilize these observations to reduce the information content in the data contained in a compressed image file, and thus reduce the amount of data required to store and/or transmit the image. These conventional techniques are limited, therefore, to the patterns underlying digital image data that the designers predetermined. The described methods, systems, and devices are not based on such predetermined patterns but, instead, on the realization that there are patterns in digital image data that humans have not been able to discern or explain that may be used to push image compression levels far beyond those achievable by conventional methods. The methods, systems, and devices described herein utilize machine learning techniques to detect these patterns, build a model that captures these patterns, and apply the model parameters to compress and decompress digital images at compression ratios unachievable by conventional methods.

According to certain embodiments, machine learned model parameters that represent patterns appearing in digital images are used to translate a digital image file from a set of pixel intensities to a combination of latent variables. The data required to transmit and store the combination of latent variables is much less than the data required to transmit and store the set of pixel intensities, resulting in a compressed digital image file. This is true because the combination of latent variables capture the inherent low-dimensional structure of the digital image data. Higher level representations are of lower dimensionality than the original image data, and therefore, require less data to store and transmit. According to some embodiments, the compressed digital image is decompressed by translating the compressed digital image data, using the model parameters, back into a set of pixel intensities that reconstruct the original digital image. Although the reconstructed digital image may be somewhat distorted, the amount of distortion may be significantly less than that created using conventional compression techniques at comparable compression ratios.

The machine learned model parameters are generated using a learning machine. The learning machine is built based on machine learning techniques that seek to detect high level structure in a set of training data. The learning machine operates on a set of training images, and by processing the training images based on the machine learning techniques, learns a machine learned model for describing digital images. The parameters of the machine learned model may then be used to compress and decompress digital images.

In some embodiments, the learning machine is built in a layered structure where the output of one layer serves as the input to the next layer. This layered structure allows each layer to learn higher level patterns than the prior layer. Training images are divided into regions and machine learning techniques are applied based on the individual regions. Representations of the regions are constructed by converting from pixel space (the original digital image file) to latent variable space using the machine learned model parameters. Neighboring region representations are combined into a new set of regions. The new set of regions is then used as inputs to the next layer of the structure and machine learned model parameters are determined for the new set of image regions. This process may continue for multiple levels, with each level corresponding to larger fields of view and ever higher compression ratios.

According to certain embodiments, machine learned model parameters are applied during image compression utilizing a similar layered structure. An original image is transformed using machine learned model parameters by swapping out original image regions for modeled regions at each progressive layer of the layered structure. At each layer, the field of view is expanded allowing almost an exponential increase in the compression ratio from one layer to the next, without a significant increase in the number of bits required to represent the modeled regions. The higher up the layered structure, the higher the compression ratio, but also the more lossy the compression.

According to some embodiments, a computer implemented method for machine learning model parameters for image compression, includes partitioning a plurality of image files stored on a first computer memory into a first set of regions, determining a first set of machine learned model parameters based on the first set of regions, the first set of machine learned model parameters representing a first level of patterns in the plurality of image files, constructing a representation of each region in the first set of regions based on the first set of machine learned model parameters, constructing representations of the plurality of image files by combining the representations of the regions in the first set of regions, partitioning the representations of the plurality of image files into a second set of regions, determining a second set of machine learned model parameters based on the second set of regions, the second set of machine learned model parameters representing a second level of patterns in the plurality of image files; and storing the first set of machine learned model parameters and the second set of machine learned model parameters on one or more computer memories.

According to certain embodiments, the first set of machine learned model parameters and the second set of machine learned model parameters are used to compress and decompress a digital image file stored on a second computer memory. According to certain embodiments, each of the image files comprises pixel values for rendering an image on a display and each of the regions in the first set of regions comprises a subset of the pixel values for rendering a corresponding region of the image on the display. According to certain embodiments, each region in the first set of regions overlaps at least one other region in the first set of regions and each region in the second set of regions overlaps at least one other region in the second set of regions.

According to certain embodiments, each of the first set of regions comprises an M by M array of pixel values, wherein M is an integer. According to certain embodiments, each of the second set of regions comprises an N by N array of pixel values, wherein N is greater than M. According to certain embodiments, the first set of machine learned model parameters and the second set of machine learned model parameters are determined based on a statistical method for estimating a structure underlying a set of data.

According to certain embodiments, determining a first set of machine learned model parameters comprises machine learning a first union of subspaces that estimates each of the regions in the first set of regions, wherein the first set of machine learned model parameters includes basis vectors and offsets for subspaces in the first union of subspaces and determining a second set of machine learned model parameters comprises machine learning a second union of subspaces that estimates each of the regions in the second set of region, wherein the second set of machine learned model parameters includes basis vectors and offsets for subspaces in the second union of subspaces.

According to certain embodiments, the first union of subspaces and the second union of subspaces are machine learned based on a Mixture of Factor Analyzers. According to certain embodiments, a quantity and a dimension of subspaces in the first union of subspaces are determined based on the plurality of image files, and a quantity and a dimension of subspaces in the second union of subspaces is determined based on the representations of the plurality of image files.

According to certain embodiments, a computer implemented method for compressing an image file, includes partitioning an image file into a first set of regions, constructing a representation of each region in the first set of regions based on a first set of machine learned model parameters, the first set of machine learned model parameters representing a first level of image patterns, constructing a first representation of the image file by combining the representations of the regions in the first set of regions, partitioning the first representation of the image file into a second set of regions, constructing a representation of each region in the second set of regions based on a second set of machine learned model parameters, the second set of machine learned model parameters representing a second level of image patterns, constructing a second representation of the image file by combining the representations of the regions in the second set of regions, wherein the second representation comprises coefficients of the machine learned model parameters in the second set of machine learned model parameters, selecting a plurality of elements from a predetermined list of elements to represent the model parameter coefficients, and storing a plurality of indices to the plurality of elements in a memory.

According to certain embodiments, each region in the first set of regions overlaps at least one other region in the first set of regions, and each region in the second set of regions overlaps at least one other region in the second set of regions. According to certain embodiments, the first set of machine learned model parameters and the second set of machine learned model parameters are based on a statistical model for estimating a structure underlying a set of training data. According to certain embodiments, the statistical model comprises a Mixture of Factor Analyzers.

According to certain embodiments, the first representation comprises coefficients of the machine learned model parameters in the first set of machine learned model parameters, and the method further includes selecting a second plurality of elements from a second predetermined list of elements to represent the coefficients of the machine learned model parameters in the first set of machine learned model parameters and storing a second plurality of indices to the second plurality of elements in the memory.

According to certain embodiments, a computer implemented method for decompressing an image file includes opening a compressed image file comprising a plurality of indices to a plurality of elements from a predetermined list of elements, wherein the predetermined list of elements is based on a first set of machine learned model parameters representing a first level of image patterns and a second set of machine learned model parameters representing a second level of image patterns, retrieving the plurality of elements from the predetermined list of elements based on the plurality of indices, constructing a plurality of regions of an image file by combining the plurality of elements with the second set of machine learned model parameters and blending the plurality of regions to generate an decompressed image file.

According to certain embodiments, the first set of machine learned model parameters and the second set of machine learned model parameters are based on a statistical model for estimating a structure underlying a set of training data. According to certain embodiments, the statistical model comprises a Mixture of Factor Analyzers.

According to certain embodiments, a computer implemented method for decompressing an image file includes opening a compressed image file that includes a first plurality of indices to a first plurality of elements from a first predetermined list of elements, wherein the first predetermined list of elements is based on a first set of machine learned model parameters representing a first level of image patterns, and a second plurality of indices to a second plurality of elements from a second predetermined list of elements, wherein the second predetermined list of elements is based on a second set of machine learned model parameters representing a second level of image patterns. The method further includes retrieving the first plurality of elements from the first predetermined list of elements based on the first plurality of indices, constructing a first plurality of regions of an image file by combining the first plurality of elements with the first set of machine learned model parameters, retrieving the second plurality of elements from the second predetermined list of elements based on the second plurality of indices, constructing a second plurality of regions of an image file by combining the second plurality of elements with the second set of machine learned model parameters and the first plurality of regions; and blending the second plurality of regions to generate a decompressed image file.

According to certain embodiments, a system for compressing an image file includes a training module for learning model parameters comprising a processor and a memory and one or more applications stored in the memory that include instructions for: partitioning a plurality of image files into a first set of regions, determining a first set of machine learned model parameters based on the first set of regions, the first set of machine learned model parameters representing a first level of patterns in the plurality of image files, constructing a representation of each region in the first set of regions based on the first set of machine learned model parameters, constructing representations of the plurality of image files by combining the representations of the regions in the first set of regions, partitioning the representations of the plurality of image files into a second set of regions, wherein the second set is smaller than the first set, and determining a second set of machine learned model parameters based on the second set of regions, the second set of machine learned model parameters representing a second level of patterns in the plurality of image files, and a compression module configured to generate a compressed image file based on the first set of machine learned model parameters and the second set of machine learned model parameters.

According to certain embodiments, the system includes a decompression module configured to decompress the compressed image file based on the second set of machine learned model parameters.

According to certain embodiments, a non-transitory computer readable storage medium stores one or more programs, the one or more programs include instructions, which when executed by an electronic device, cause the device to partition an image file into a first set of regions, construct a representation of each region in the first set of regions based on a first set of machine learned model parameters, the first set of machine learned model parameters representing a first level of image patterns, construct a first representation of the image file by combining the representations of the regions in the first set of regions, partition the first representation of the image file into a second set of regions, wherein the second set is smaller than the first set, construct a representation of each region in the second set of regions based on a second set of machine learned model parameters, the second set of machine learned model parameters representing a second level of image patterns, construct a second representation of the image file by combining the representations of the regions in the second set of regions, wherein the second representation comprises coefficients of the machine learned model parameters in the second set of machine learned model parameters, select a plurality of elements from a predetermined list of elements to represent the model parameter coefficients, and store a plurality of indices to the plurality of elements in a memory.

DETAILED DESCRIPTION OF THE INVENTION

Figure 1:
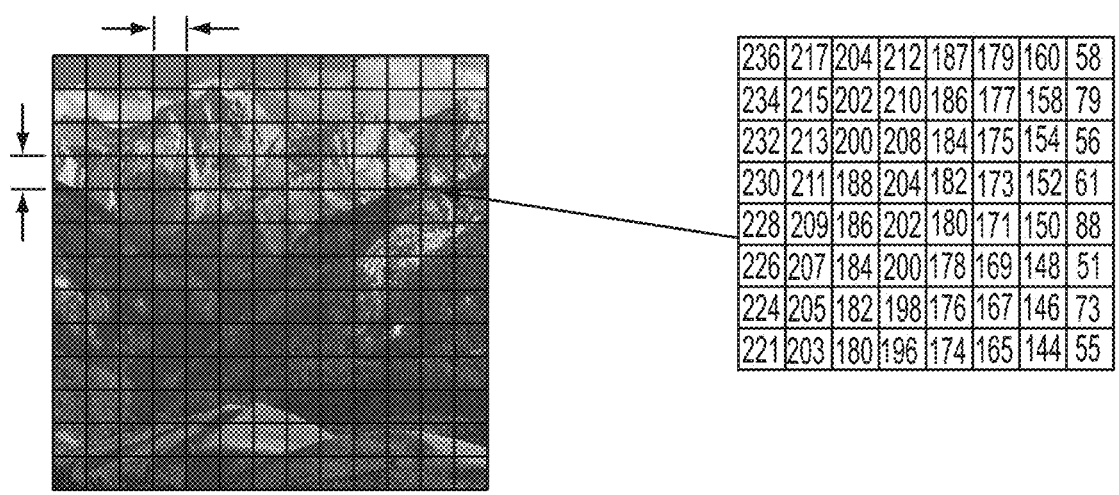
FIG. 1 is an example of the data structure of a digital image file.
Figure 2:
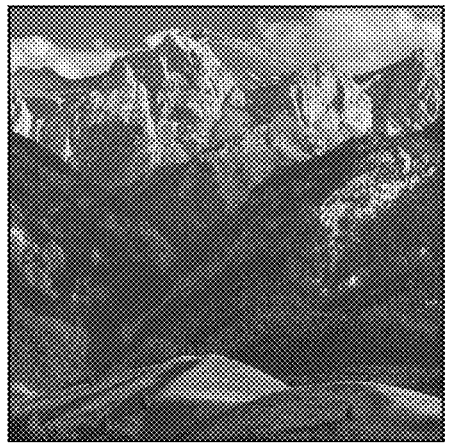
FIG. 2 is an example of the results of compressing and decompressing a digital image file according to conventional compression techniques.
Figure 2:
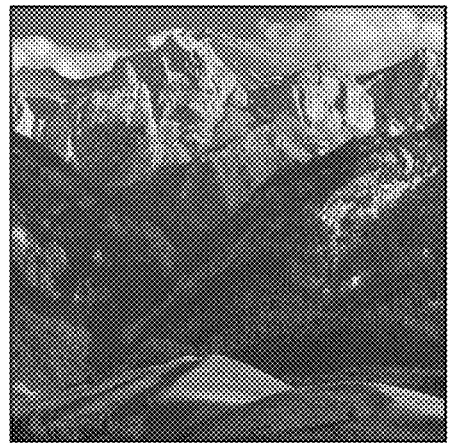
Figure 2:

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are methods, systems, and devices for compressing digital image files using machine learning techniques that allow for compression levels unattainable using conventional image compression methods. Conventional methods are generally based on human intuition into the inherent structure in digital image data. For example, as described above, JPEG encoding is based on the observation that a frequency transform may be used as a pattern for the digital image data. Such methods work well only up to a certain degree of compression. However, as compression ratios increase, the level of distortion caused by conventional compression methods becomes too great. At some compression level, the human intuition into the inherent structure fails to result in a reduced set of data that still accurately represents to the original image. Instead of relying on human inference, the described methods, systems, and devices utilize machine learning techniques to learn the structure underlying digital image data.

Generally, machine learning seeks to represent a set of data through higher level representations that are of lower dimensionality than the data. The ability to represent digital images using lower dimensional representations (also referred to herein as "features" or "patterns") allows for a reduced amount of data needed to store or transmit the information required to reproduce a digital image. Because the combination of learned features does not perfectly represent the underlying data, there is some loss in image quality and a reproduction of the original image from the combination of patterns may appear distorted. However, this loss, and thus the quality of the compressed image, may be significantly less than a comparably compressed transform-based image (such as a JPEG compressed image). The described methods, systems, and devices may produce compression ratios unachievable by conventional methods.

Compressing digital images according to the embodiments described herein can reduce the amount of data used to store and transmit digital images. Reducing the amount of data used to store and transmit digital images can allow for the computing devices and computing systems described herein, according to described embodiments, to be made smaller and cheaper and can also allow for more digital images to be stored and transmitted by existing computing devices and systems in accordance with described embodiments. Reducing the amount of data used to transmit digital images can increase the usability of such computing devices and computing systems because more digital images can be transmitted between computing devices and systems at a faster rate. Therefore, compression of digital images according to the described invention can enable users of computing devices and systems to capture, download, store, and share more digital images with greater ease.

According to the described embodiments, a digital image file is compressed by transforming it into a collection of patterns (features). These patterns are computed in a process that utilizes a machine learned model to project the image patches onto the latent union of subspaces. After compressing a digital image file using the parameters of the machine learned model, the compressed digital image file may be stored or transferred using much less storage space, less bandwidth, and less data transfer time. In order to render the digital image on a display, the compressed digital image file is decompressed using the same machine learned model parameters. This compression method is a lossy method, and thus, the representation of the original image created by compressing and decompressing the original digital image file may contain distortion, but the amount of distortion may be far less than that caused by conventional lossy compression techniques.

According to certain embodiments, a system includes a multi-layer feature extracting machine learning model that learns multiple levels of features in a set of training data. The system learns multiple levels of features with each layer learning a higher level feature than the previous layer by using the features learned by the previous layer. The system compresses (encodes) an original image using the multilayered machine learned model parameters by swapping out original regions for modeled regions in a similarly layered structure. In some embodiments, this process can produce almost an exponential increases in the compression ratio since the field of view is recursively expanded by a factor of four (×2 in row and column) for each progression to the next layer, without a significant increase in the number of bits required to represent the larger regions. According to certain embodiments, the higher up the machine learning model layers of the system, the higher the achievable compression ratio, but also the more lossy the compression.

Machine Learning Model Parameters

Figure 3A:
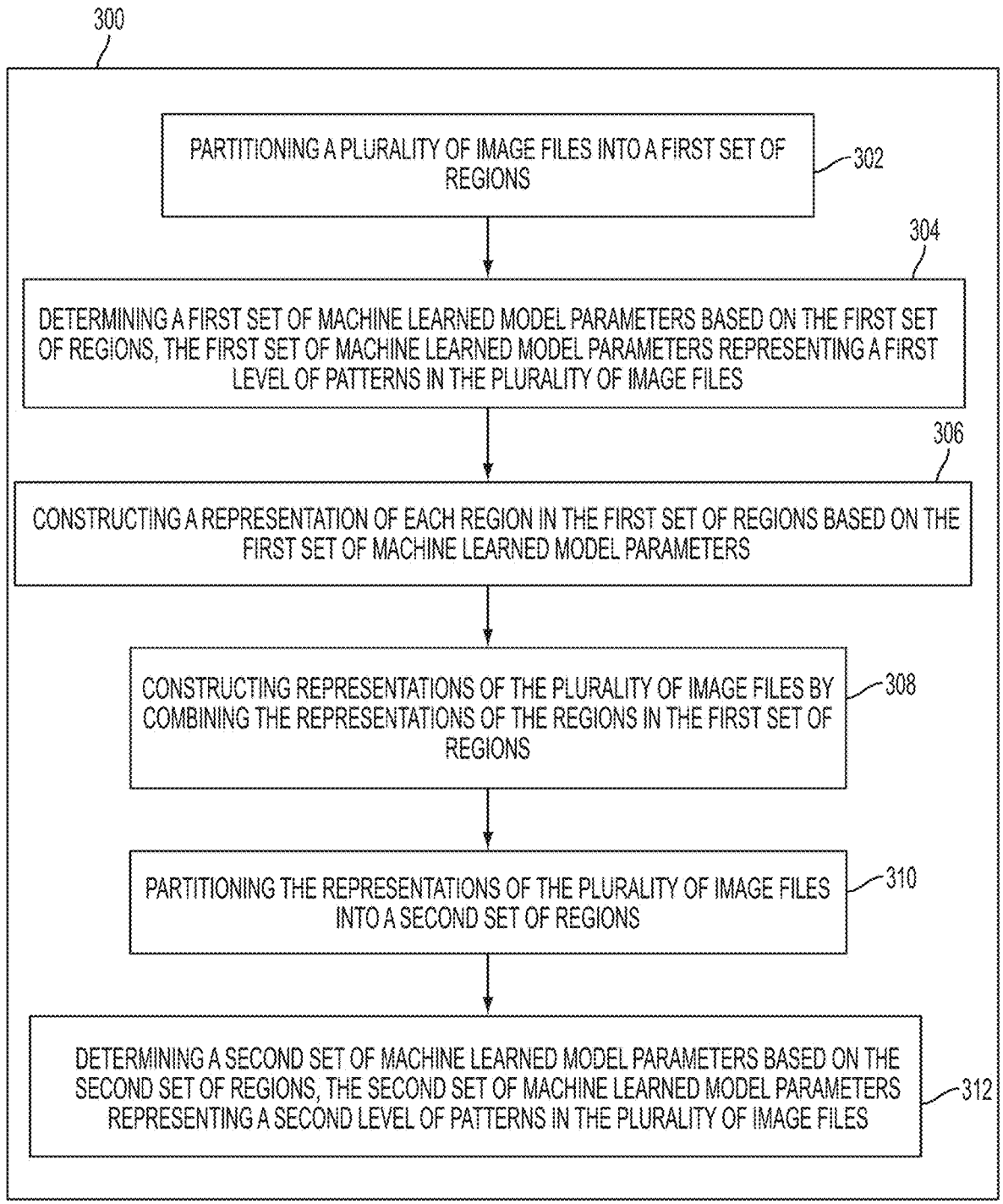
FIG. 3A is a flow diagram of steps for machine learning model parameters according to certain embodiments.

Described herein are systems for compressing and decompressing digital image files using machine learned model parameters. The systems may determine machine learned model parameters for compressing and decompressing digital image files by executing the methods described below. FIG. 3 is a flow diagram illustrating method 300 for machine learning model parameters for image compression according to some embodiments. Method 300 is performed by a computing device with a processor and a memory (e.g., the computing system 1300 illustrated in FIG. 13), according to the systems described herein. Method 300 may be included in one or more programs stored in the memory that, when executed by the processor, cause the computing device to machine learn model parameters for image compression. According to certain embodiments, a processor may be a general purpose processor or it may be specially selected for executing method 300. Example of general purpose processors according to certain embodiments are single-core or multi-core microprocessors such as, for example, a Pentium® processor, a Pentium® II processor, a Pentium® Pro processor, a Pentium® III processor, Pentium® 4 processor, a Core Duo® processor, a Core 2 Duo® processor, a Xeon® processor, an Itanium® processor, a Pentium® M processor, an x86 processor, an Athlon® processor, an 8051 processor, a MIPS® processor, a PowerPC® processor, an ALPHA® processor, etc. Examples of processors that may be specially selected according to certain embodiments include digital signal processors or graphics processing units. Method 300 may require extensive computations on large sets of data and such special purpose processors are known to handle such complex computations and large amounts of data well. In some embodiments, method 300 is executed on a multi-core processor that enables parallel processing for faster computation times. In some embodiments, method 300 is executed on multiple processors in parallel, enabling faster computation time.

Method 300 is performed offline. That is, method 300 is performed prior to compressing a digital image file. For example, method 300 may be executed and the resulting machine learned model parameters may be built into a compression software application that may be executed on a computing device to compress and decompress a digital image file. The machine learned model parameters are learned by a system according to some embodiments by initializing a machine learning model that includes one or more learning machines, feeding the machine learning model a set of training data, in the form of digital images, and allowing the model to mold itself to the data. During the modeling process, the system adjusts it the model parameters to better fit the training data.

At step 302, a plurality of image files stored in a memory are partitioned into a first set of regions. The plurality of image files (also referred to as training images) are training data used by method 300 to learn the machine learned model parameters. Each of the image files includes an array of pixel values for rendering an image on the display of a computing device. According to certain embodiments, the training images may be selected based on the intended use of the image compression method. For example, where image compression will be used on images of areas of land (e.g., satellite images), the training images may be various images of land. Training learning machines using targeted training data such as this may result in fewer machine learned model parameters, which allows for simpler compression and decompression processes. Generally, the more diversity in the training images the more robust the machine learned model parameters will be, that is, the better the machine learned model parameters will detect patterns in any given digital image. According to certain embodiments, the training data is not specialized but is generalized so that the resulting machine learned model parameters are able to detect patterns in any or most digital images. According to certain aspects, the greater the variation in the training images used (e.g., images of machines, faces, landscapes, etc.) the greater the number of machine learned model parameters, and therefore, the larger the storage space required for a compression algorithm based on those parameters.

In certain embodiments, the training images are the same size. For example, each training image is m×n pixels. In certain embodiments, the training images are square (m×m pixels). In certain embodiments, the training images vary in size and are adjusted prior to using them as input into a learning machine, for example, by trimming or scaling. In certain embodiments, training images of varying size may be used in original form. According to certain embodiments, training images include 8 bit, 12 bit, 16 bit, or higher pixel values.

The training images may be partitioned by dividing each array of pixel values into sub-arrays (also referred to interchangeably as regions or patches) of pixel values. Each sub-array, or region, of pixel values corresponds to a region of the corresponding image. For example, a sub-array of pixel values may include the pixel values used to render an eye region of an image of a face. The first set of regions may be the collection of the sub-arrays of pixel data from each of the images files in the plurality of image files. In some embodiments, training images are partitioned into 8×8 regions of pixel values. In some embodiments, training images are partitioned into regions of other sizes (e.g., 16×16, 32×32, etc.). In some embodiments, regions overlap other regions. In some embodiments, each region overlaps at least one other region. In some embodiments each region overlaps each of its neighboring regions. According to certain embodiments, the amount of overlap is large enough to handle all expected translations of image regions to be learned. According to certain embodiments, the amount of overlap is 50% to 90%. In certain embodiments, the amount of overlap is dependent on the size of the image. In some embodiments, each region in the set of training images may be represented mathematically as an m-dimensional vector, where m is the number of pixels in the region. For example, for an 8×8 image region, a vector representation of the region may be a 64-dimensional vector.

In some embodiments, the image files are stored in a hard drive, or some other non-volatile type of memory (such as HDDs, CDs, DVDs, tapes, etc.), of a computing device of the system and partitioning the images files includes loading the image files from the non-volatile memory to a volatile memory, such as the computing device's random access memory. In some embodiments, the first set of regions is stored in the computing device's volatile memory for fast access. In some embodiments, the first set of regions is stored in the computing device's non-volatile memory. In some embodiments, the image files are stored on a memory with low random read performance, such as HDDs, CDs, DVDs, tapes, etc. In some embodiments, a memory with better read IO random performance, such as a solid-state drive (SSD), is used to store the image files to increase the speed of the partitioning and processing of the image files.

At step 304, a first set of model parameters is determined based on the first set of regions of the training images. The first set of model parameters is determined using a learning machine. The learning machine determines a set of model parameters by defining a general set of relationships and adjustable parameters and applying these relationships and parameters to the training data from which model parameters are to be learned. The machine learned model parameters represent features of the training data. The combination of relationships and parameters is a learning machine. The process of learning the model parameters consists of the learning machine adjusting its parameters in order to better model the training data. Upon completing the learning process, the machine learned model parameters embody the patterns learned from the training data. According to certain embodiments, various types of learning machines may be used to determine the first set of machine learned model parameters. These types of learning machines are described in further detail in the following sections.

At step 306, a representation of each region in the first set of regions is constructed based on the first set of machine learned model parameters. The representation of each region in the first set of regions may be constructed by translating each region from its native language of pixel intensities to a combination of the machine learned model parameters. In other words, the regions in the first set of regions are represented by the features learned by the learning machine in step 304. At step 308, representations of the plurality of image files are constructed by combining the representations of the regions in the first set of regions. This step results in the plurality of image files being represented by combinations of the features learned by the learning machine in step 304.

At step 310, the representations of the plurality of image files are partitioned into a second set of regions. Each region in the second set of regions is larger than each region in the first set of regions. For example, where each region in the first set of regions is an M×M array of pixel values, each region in the second set of regions may be an N×N array, where N is greater than M. Because the field of view of the regions in the second set of regions is larger than in the first set of regions, the number of regions in the second set of regions is usually smaller than the number of regions in the first set of regions in step 302. However, according to certain embodiments, the number of regions in the second set of regions may be equal to or greater than the number of regions in the first set of regions due to a greater overlap between regions in the second set relative to the first set. In certain embodiments, the size of a region in the second set of regions is a multiple of the size of a region in the first set of regions. In some embodiments, the size of a region in the second set of regions is a multiple of two times the size of a region in the first set of regions. For example, where a region in the first set of regions is an 8×8 array, a region in the second set of regions may be a 16×16 array. Each region of the second set of regions corresponds to a region of the corresponding image. For example, a region may include the pixel values used to render an eye and part of a nose region of an image of a face. The second set of regions may be the collection of the regions of pixel data from each of the images files in the plurality of image files. In some embodiments, the representations of the plurality of image files are partitioned into 8×8 regions of pixel values. In some embodiments, the representations of the plurality of image files are partitioned into regions of other sizes (e.g., 16×16, 32×32, etc.). In some embodiments, regions overlap other regions. In some embodiments, each region overlaps at least one other region. In some embodiments each region overlaps each of its neighboring regions. According to certain embodiments, the amount of overlap is 50% to 90%. In certain embodiments, the amount of overlap is dependent on the size of the image. In some embodiments, each region in the set of training images may be represented mathematically as an m-dimensional vector, where m is the number of pixels in the region. For example, for an 8×8 image region, a vector representation of the region may be a 64-dimensional vector.

At step 312, a second set of machine learned model parameters is determined based on the second set of regions. As in step 304, the second set of model parameters is determined using a learning machine. The learning machine of this step generally operates in much the same way as in step 304 except that the input is not the raw training data, but instead the representations of the training data constructed based on the first set of machine learned model parameters. Therefore, the machine learned model parameters learned in this step represent higher level features of the training data. The learning machine used in this step may be the same type of learning machine used in step 304 or it may be a different type of learning machine.

Although method 300 is described with two layers of machine learning model parameters, this process may continue for more than two layers to generate additional sets of machine learned model parameters. According to certain embodiments, the method continues with additional layers until a model layer fails to find meaningful low-dimensional structure in the data. The hard limit on the number of layers is reached when region size equals or exceeds image size, but the number of levels may be stopped well before that point when the modeled image regions begin to deviate too far in terms of distortion from the previous layer. According to certain embodiments, the number of levels is stopped when the region size reaches around 128×128 pixels (corresponding to five levels if starting patch size is 8×8 and the field of view is expanded by a factor of two in row and column at each succeeding level).

Once training of the learning machine is complete, the machine learned model parameters may be used to compress and decompress digital image files. During compression, an image is translated into the language of the model using the model parameters. During decompression, the machine learned model parameters are used to retranslate the image back into its native language of pixel intensities. Because the machine learned model is more sophisticated than the standard JPEG DCT model, higher levels of compression are achievable for comparable levels of distortion.

Compression and Decompression Using Machine Learned Model Parameters

Figure 3B:
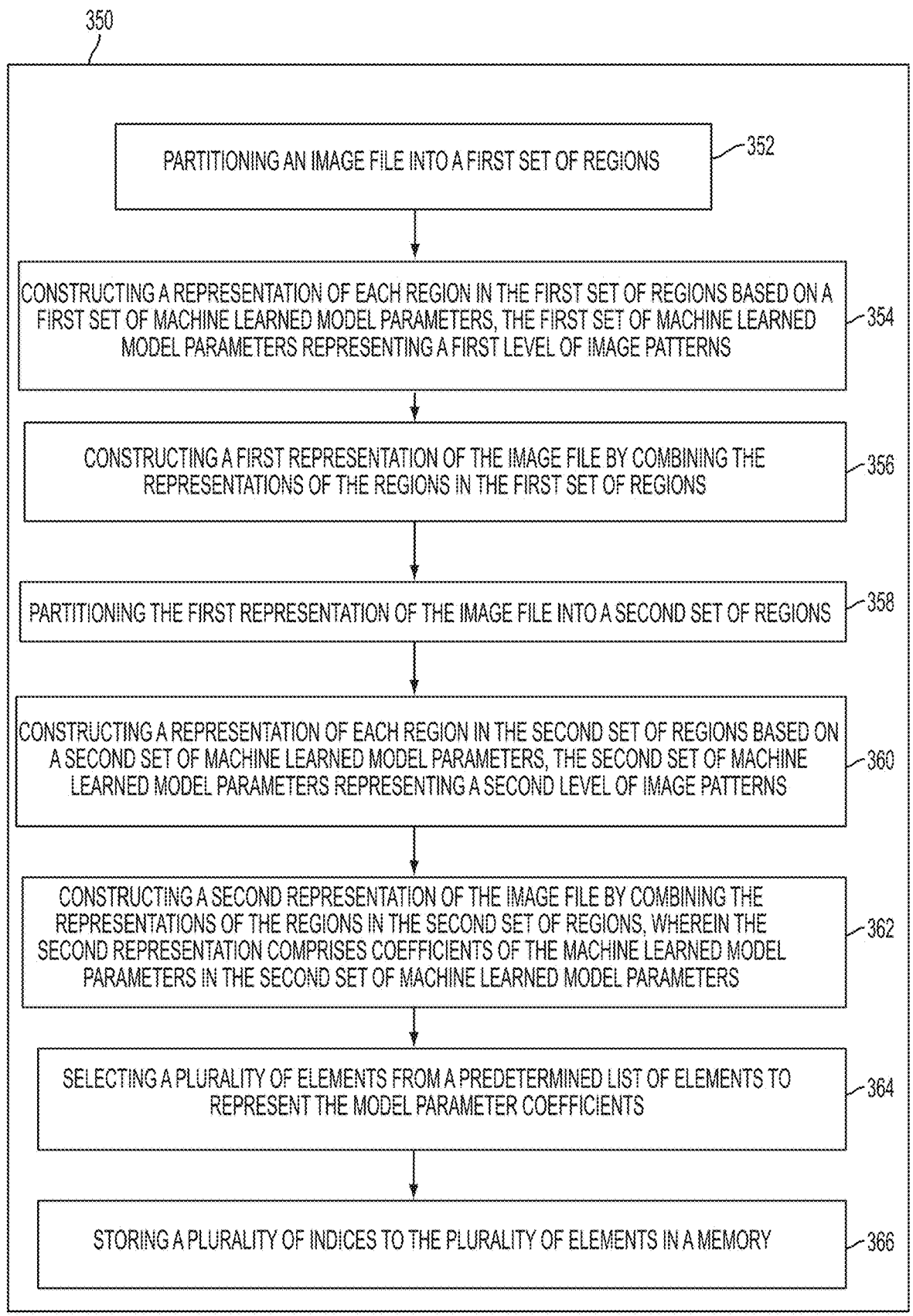
FIG. 3B is a is a flow diagram of the steps for compressing a digital image file according to certain embodiments.

According to certain embodiments, a system compresses a digital image file based on the machine learned model parameters generated by the system as described above. FIG. 3B is a flow diagram illustrating method 350, performed by the system to compress a digital image file. Method 350 is performed by a computing device of the system that includes a processor and a memory. Method 350 may be included in one or more programs stored in the memory that when executed by the processor, cause the computing device to compress an image file. The processor may be a general purpose processor or it may be specially selected for executing method 350. Example of general purpose processors according to certain embodiments are single-core or multi-core microprocessors such as, for example, a Pentium® processor, a Pentium® II processor, a Pentium® Pro processor, a Pentium® III processor, Pentium® 4 processor, a Core Duo® processor, a Core 2 Duo® processor, a Xeon® processor, an Itanium® processor, a Pentium® M processor, an x86 processor, an Athlon® processor, an 8051 processor, a MIPS® processor, a PowerPC® processor, an ALPHA® processor, RM® processor, other processors based on a reduced instruction set computing (RISC) architecture, etc. Examples of processors that may be specially selected according to certain embodiments include digital signal processors or graphics processing units. Method 350 may be performed on a handheld computing device, such as a mobile phone or PDA to compress digital image files captured by a digital camera included in the handheld computing device. Using method 350 to compress captured digital images would enable the handheld computing device to store more digital images and make it easier for the handheld computing device to transfer the digital images over a network (e.g., over a cellular network or over a local area network accessed through a Wifi adapter) to other computing devices (e.g., other handheld devices, laptop or desktop computers, or computer servers).

At step 352, an image file is partitioned into a first set of regions. The image file includes an array of pixel values for rendering an image on the display of a computing device. The array of pixel values may be of any size. Pixel values may be 8 bit, 12 bit, 16 bit, or higher. The image file is partitioned by dividing the array of pixel values into sub-arrays, or regions, of pixel values. The image file is an uncompressed image file that may be stored on a computing device in non-volatile memory, such as a hard disk or flash storage, or may be stored in non-volatile memory after being generated by a digital camera attached to or incorporated in the device. In some embodiments, regions overlap other regions. According to certain embodiments, the amount of overlap between regions may be relatively small. For example, in certain embodiments, the amount of overlap is less than 50%. Generally, the lower the overlap, the higher the resulting compression ratio. In some embodiments, each region overlaps at least one other region. In some embodiments each region overlaps each of its neighboring regions. In certain embodiments, the amount of overlap is dependent on the size of the image. In some embodiments, each region may be represented mathematically as an m-dimensional vector, where m is the number of pixels in the region. For example, for an 8×8 image region, a vector representation of the region may be a 64-dimensional vector.

At step 354, a representation of each region in the first set of regions is constructed based on a first set of machine learned model parameters. The first set of machine learned model parameters have been generated by method 300, described above. The representation of each region in the first set of regions may be constructed by translating each region from its native language of pixel intensities to a first set of latent variables. In other words, the regions in the first set of regions are represented by the features learned according to method 300. At step 356, a representation of the image file is constructed by combining the representations of the regions in the first set of regions. This step results in the image file being represented by combinations of the features learned during method 300.

At step 358, the representation of the image file is partitioned into a second set of regions. Each region in the second set of regions is larger than each region in the first set of regions. For example, where each region in the first set of regions is an M×M array of pixel values, each region in the second set of regions may be an N×N array where N is greater than M. Because the field of view of the regions in the second set of regions is larger than in the first set of regions, the number of regions in the second set of regions is usually smaller than the number of regions in the first set of regions in step 352. However, according to certain embodiments, the number of regions in the second set of regions may be greater than the number of regions in the first set of regions due to a greater overlap between regions in the second set relative to the first set. According to certain embodiments, the amount of overlap between regions may be relatively small. For example, in certain embodiments, the amount of overlap is less than 50%. Generally, the lower the overlap, the higher the compression ratio. In some embodiments, each region overlaps at least one other region. In some embodiments each region overlaps each of its neighboring regions. In certain embodiments, the amount of overlap is dependent on the size of the image. In certain embodiments, the size of a region in the second set of regions is a multiple of the size of a region in the first set of regions. In some embodiments, the size of a region in the second set of regions is a multiple of two times the size of a region in the first set of regions. For example, where a region in the first set of regions is an 8×8 array, a region in the second set of regions may be a 16×16 array.

At step 360, a representation of each region in the second set of regions is constructed based on a second set of machine learned model parameters. The second set of machine learned model parameters have been generated by method 300 in the manner described above. The representation of each region in the second set of regions may be constructed by translating each region from its combination of the first set of machine learned model parameters to a combination of the second set of machine learned model parameters. In other words, the regions in the first set of regions are represented by the features learned according to method 300.

At step 362, a second representation of the image files is constructed by combining the representations of the regions in the second set of regions. The second representation includes coefficients of the machine learned model parameters in the second set of machine learned model parameters. The coefficients define the presence in the image file of the features represented by the machine learned model parameters in the second set of machine learned model parameters. At step 364, a plurality of elements from a predetermined list of elements are selected to represent the model parameter coefficients. This step eliminates features that do not appear in the digital image file from the data by taking advantage of the fact that many of the coefficients of the machine learned model parameters will be zero or close to zero, indicating that a respective feature does not appear in the image. At step 366, a plurality of indices to the plurality of elements is stored in a memory. This stored set of indices is the compressed digital image file that may be saved to a memory of a computing device executing method 350 or that may be transferred to another computing device over a network. A compressed digital image file generated using method 350 may be much smaller than a compressed digital image file generated using conventional digital image compression methods.

Although method 350 is described with respect to two layers of machine learned model parameters, the method may continue for additional layers. For example, the method may continue for three, four, five, or more layers, or until a model layer fails to find meaningful low-dimensional structure in the data. The hard limit on the number of layers is reached when region size equals or exceeds image size, but the number of levels may be stopped well before that point when the modeled image regions begin to deviate too far in terms of distortion from the previous layer. Often, the number of levels is stopped when the region size reaches around 128×128 pixels (corresponding to five levels if starting patch size is 8×8 and the field of view is expanded by a factor of two in row and column at each succeeding level).

Figure 3C:
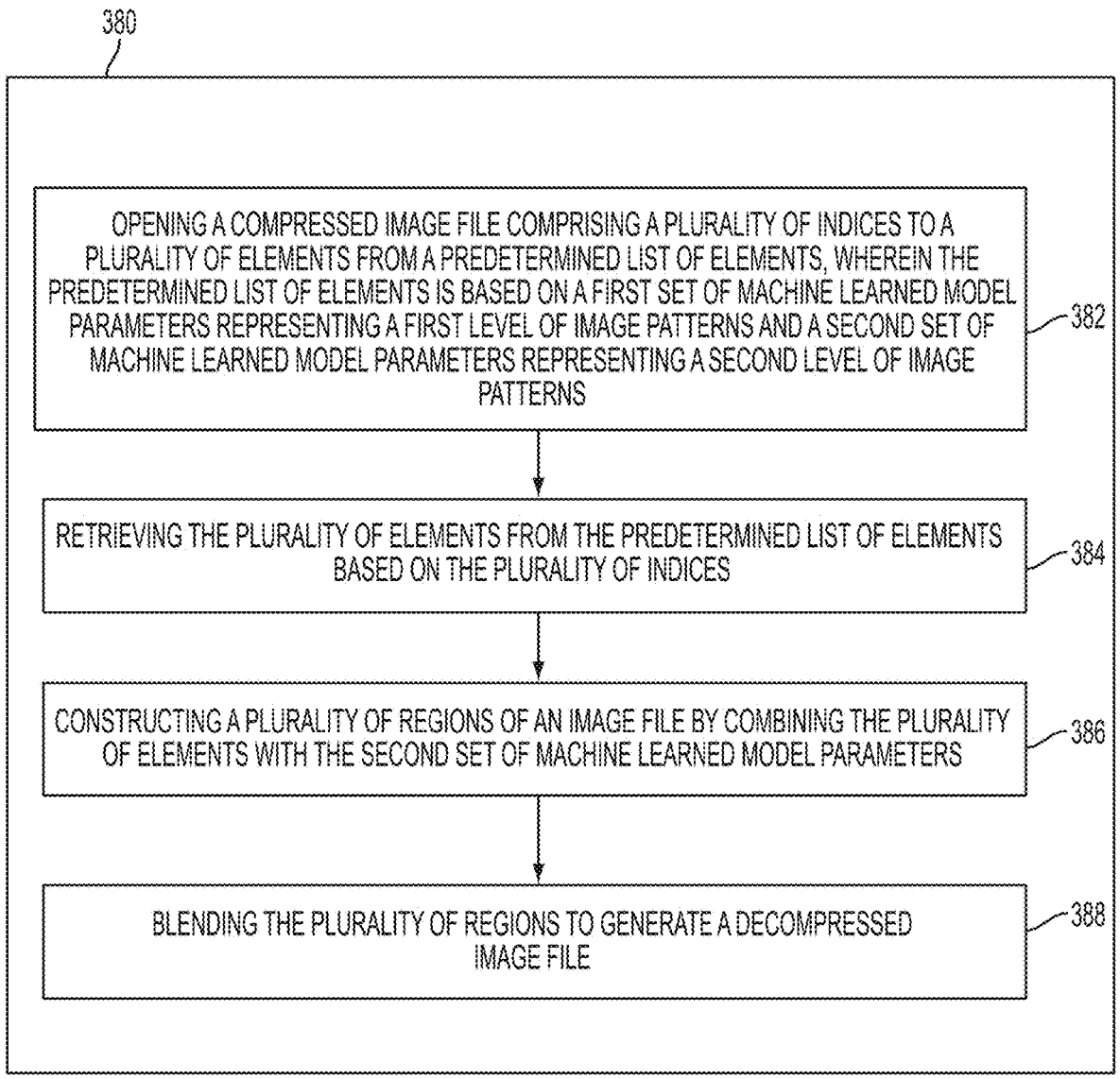
FIG. 3C is a is a flow diagram of the steps for decompressing a digital image file according to certain embodiments.

According to certain embodiments, a system decompresses a digital image file compressed by the system as described above based on the machine learned model parameters used to compress the digital image file. FIG. 3C is a flow diagram illustrating method 380 that is executed by the system to decompress a digital image file. Method 380 is performed by a computing device of the system with a processor and a memory. Method 380 may be included in one or more programs stored in the memory that when executed by the processor, cause the computing device to decompress an image file. The processor may be a general purpose processor or it may be specially selected for executing method 380. Example of general purpose processors according to certain embodiments are single-core or multi-core microprocessors such as, for example, a Pentium® processor, a Pentium® II processor, a Pentium® Pro processor, a Pentium® III processor, Pentium® 4 processor, a Core Duo® processor, a Core 2 Duo® processor, a Xeon® processor, an Itanium® processor, a Pentium® M processor, an x86 processor, an Athlon® processor, an 8051 processor, a MIPS® processor, a PowerPC® processor, an ALPHA® processor, RM® processor, other processors based on a reduced instruction set computing (RISC) architecture, etc. Examples of processors that may be specially selected according to certain embodiments include digital signal processors or graphics processing units. Method 380 may be performed on a handheld computing device, such as a mobile phone or PDA to decompress digital image files stored on the computing device or received from another computing device over a network. Executing method 380 to decompress compressed digital images enables a handheld computing device to display digital image files compressed according to method 350 described above. Therefore, the handheld computing device is able to store and display more images and receive and display images faster and with fewer network resources than comparable computing devices using conventional compression and decompression methods.

At step 382, a compressed image file is opened. The compressed image file includes a plurality of indices to a plurality of elements from a predetermined list of elements. The predetermined list of elements may be a codebook and the plurality of elements may be code words in the codebook. The predetermined list of elements is based on a first set of machine learned model parameters and a second set of machine learned model parameters learned according to method 300, described above. At step 384, the plurality of elements are retrieved from the predetermined list of elements based on the plurality of indices. At step 386, a plurality of regions of an image file are constructed by combining the plurality of elements with the second set of machine learned mode parameters. At step 388, the plurality of regions are blended to generate a decompressed image file. According to certain embodiments, the plurality of regions are blended based on a predetermined amount of overlap between regions. The predetermined amount of overlap may be based on the amount of overlap of the regions in the second set of regions used in step 358, above. According to certain embodiments, the amount of overlap is a predetermined percentage. For example, in some embodiments, the amount of overlap is 50% or less. The decompressed image file may then be used to render an image on a display. The image is a representation of the original image captured in the original uncompressed image file. As described above, the compression process according to the embodiments described herein is lossy, possibly resulting in some degradation in image quality. However, the image quality may be much better than that derived from an image file compressed using a conventional image compression method.

Learning Machines

As described above, systems and devices according to certain embodiments include a multi-layer feature extracting machine learning model that enables the systems and devices to learn multiple levels of features in a set of training data. Each layer learns a larger field of view than the previous layer by using the output of the previous layer. In a layer, a learning machine is used to learn the features of its input data, and the learned features serve as inputs to a next layer. Learning machines for each layer, according to certain embodiments, may be built based on various machine learning techniques. Techniques incorporated into certain learning machines of the systems and devices, may be broadly categorized as approaches based on probabilistic graphical models, neural networks, and manifold learning.

Probabilistic graphical models attempt to develop a minimal set of latent random variables that describe patterns in pixel data using probability based relationships. Examples of probabilistic graphical models are principal component analysis, sparse coding, sigmoid belief networks, spike-and-slab sparse coding models and Markov random fields, which are also called Boltzman (of which, Restricted Boltzman Machines are the most popular).

An example of a neural network used for feature learning is an autoencoder. Generally speaking, an autoencoder explicitly defines a feature extracting function and then modifies the function to extract more accurate features. During the encoding step of an autoencoder, a defined function computes a feature given an input. The function is then used to map from the feature space back to input space producing a reconstruction. An autoencoder learns features by attempting to minimize the reconstruction error—the difference between the original data and the reconstructed data. Examples of autoencoders are regularized autoencoders, sparse autoencoders, denoising autoencoders, and contractive autoencoders.

Manifold learning works on the assumption that high-dimensional input data, such as that in a digital image file, concentrates near a manifold of much lower dimensionality. Describing input data in terms of a low dimensional manifold allows for a reduction in the data required to describe the data. Examples of manifold learning models are locally linear embedding, hessian eigenmapping, spectral embedding, and isometric mapping.

Although these techniques vary from one to another in some respects, they share many aspects. Many of these techniques perform clustering, dimensionality reduction, and density estimation. According to certain embodiments, clustering, dimensionality reduction, and density estimation are incorporated into learning machines for a multi-layer feature extracting machine learning model.

Clustering is a type of unsupervised learning in which a set of inputs is divided into groups. Characteristics that are highly interrelated cluster together while characteristics that are unrelated separate. Each cluster represents a pattern in the data, and therefore, can be used to represent the data in simpler form. Examples of clustering algorithms according to certain embodiments are K-means, affinity propagation, mean-shift, spectral clustering, ward hierarchical clustering, agglomerative clustering, and Gaussian mixtures. Dimensionality reduction generically refers to a mapping of high-dimensional space onto low-dimensional space. Density estimation constructs an estimate, based on observed data such as training data, of an unobservable underlying probability density function, which is a function that describes the relative likelihood for a random variable to take on a given value. Types of density estimating algorithms, according to certain embodiments, are kernel density estimators and Gaussian mixtures.

According to some embodiments, a learning machine based on factor analysis is used for building a machine learning model. Factor analysis is a type of probabilistic graphical model that assumes the existence of an unobserved variable that is linearly related to a first input variable and a second input variable and explains the correlation between them. The goal of factor analysis is to estimate this unobserved variable from the structure of the original variables. Factor analysis enables clusters of vectors to be defined. Each factor delineated by factor analysis defines a distinct cluster of vectors. The projection of each vector point on the factor axes defines the clusters. These projections are called loadings and the factor axes are referred to as factors or dimensions. Factor analysis is also a local dimensionality reduction technique, modeling correlations in multidimensional data by expressing the correlations in a lower dimensional subspace, and hence, reducing the input space from a larger number of observable variables to a smaller number of latent variables called factors. Factor analysis models each observation by dividing it into two parts: an unobserved systematic part taken as a linear combination of a set of underlying factors and an unobserved error part whose elements are considered as uncorrelated. Factor analysis generally assumes that the factor and the error vectors follow Gaussian distributions.

According to certain embodiments, a learning machine based on a mixture of factor analyzers (MFA) model is used to generate machine learned model parameters. An MFA is a global nonlinear statistical approach for the representation of an observed dataset onto a lower dimensional latent subspace obtained by hypothesizing a finite mixture of factor analysis models (linear submodels) for the distribution of the full observed data, given the un-observable (latent) factors. An MFA model is a reduced dimensionality case of a Gaussian Mixture Model allowing for the reduction of the degrees of freedom of the covariance matrices of the mixture densities while maintaining the recognition performance. According to certain embodiments, an MFA is a statistical method for estimating a structure underlying a set of data, specifically a set of training images. The MFA model, according to certain embodiments can model the density of high dimensional observations adequately while also allowing concurrent performance of clustering, and within each cluster, local dimensionality reduction, presenting several benefits over a scheme in which clustering and local dimensionality reduction are conducted separately.

In some embodiments, a learning machine based on a Bayesian nonparametric mixture of factor analyzers (BNP-MFA) is used to generate machine learned model parameters. Generally, Bayesian analysis refers to a statistical procedure that attempts to estimate unknown parameters of an underlying distribution based on an observed distribution. A "prior" distribution, which may be based on anything including an assessment of the relative likelihoods of parameters or the results of non-Bayesian observations, is also used in Bayesian analysis. In practice, it is common to assume a uniform distribution over the appropriate range of values for the prior distribution, although other distributions, such as Gaussian distributions, may also be used.

Given the prior distribution, data for an observed distribution is collected and the likelihood of the observed distribution as a function of parameter values is calculated. "Likelihood" is the hypothetical probability that an event which has already occurred would yield a specific outcome. The likelihood function is multiplied by the prior distribution and normalized to obtain a unit probability over all possible values, referred to as the posterior distribution. The "mode" (i.e., the most commonly occurring value) in the posterior distribution yields the machine learned model parameter estimate.

There are several advantages to using a BNP-MFA as the foundation for a machine learning model:
  Accuracy: Statistical models like MFAs empirically show higher test log-likelihoods (model evidence) than Boltzmann machine based models.
  Speed: Since the BNP-MFA is a conjugate-exponential model it can be learned in online variational Bayes form with stochastic variational inference giving it orders of magnitude speed improvements compared to Markov chain Monte Carlo methods.
  Scales with data: Since the model is Bayesian nonparametric, there is no model overfitting and only a few relatively insensitive hyperparameters need to be set.

Deep Learning Compression Model

In some embodiments of the systems and devices described herein, a machine learning model, called a deep learning compression model, is used, which employs a multilayer structure in which the output of one layer serves as the input to the next layer. Each layer of the multilayer structure can be thought of as a learning machine that learns features in its input data. Where the input data to a layer is itself a combination of learned features, the features learned by the layer are higher level features (of lower dimension) than those learned from the previous layer. According to certain embodiments, this architecture may lead to progressively more abstract features at higher layers of representations (more removed from the data).

Systems employing deep learning compression models according to certain embodiments may be built from combinations of the machine learning techniques described above. Deep learning compression models, used in certain embodiments, have in common multiple layers of nonlinear processing units and learning of feature representations in each layer, with the layers forming a hierarchy from low-level to high-level features. According to certain embodiments, a layered process may continue for as many layers as may produce meaningfully higher level features. Examples of deep learning models according to certain embodiments are deep neural networks, deep belief networks, convolutional neural networks, convolutional deep belief networks, deep Boltzmann machines, stacked auto-encoders, deep stacking networks, deep coding networks, and deep kernel machines. In some embodiments, the multi-layer structure is a multilayered hierarchical latent variable model.

In some embodiments, the deep learning compression model for learning model parameters uses a Bayesian nonparametric mixture of factor analyzers (BNP-MFA) learning machine at each layer. During training of each successive layer of the multilayer deep learning compression (DLC) model, a BNP-MFA model is learned on a transformed version of the original training data built from the model parameters learned from the previous layer.

Certain embodiments of the DLC model operate by dividing training images into regions and modeling each image region as an element of a union of subspaces (UoS). This is a more powerful representation of the image region, and can therefore lead to better compression. By way of notation, $(\cdot)^+$ denotes Moore-Penrose pseudo-inverse, $(\cdot)^{-1}$ denotes regular matrix inverse, $\|(\bullet)\|_2$ denotes $L_2$-norm, $P_{(\bullet)}$ denotes projection matrix, and $P_{(\bullet)}^{\perp}$) denotes orthogonal (or perpendicular) complement.

Figure 4:
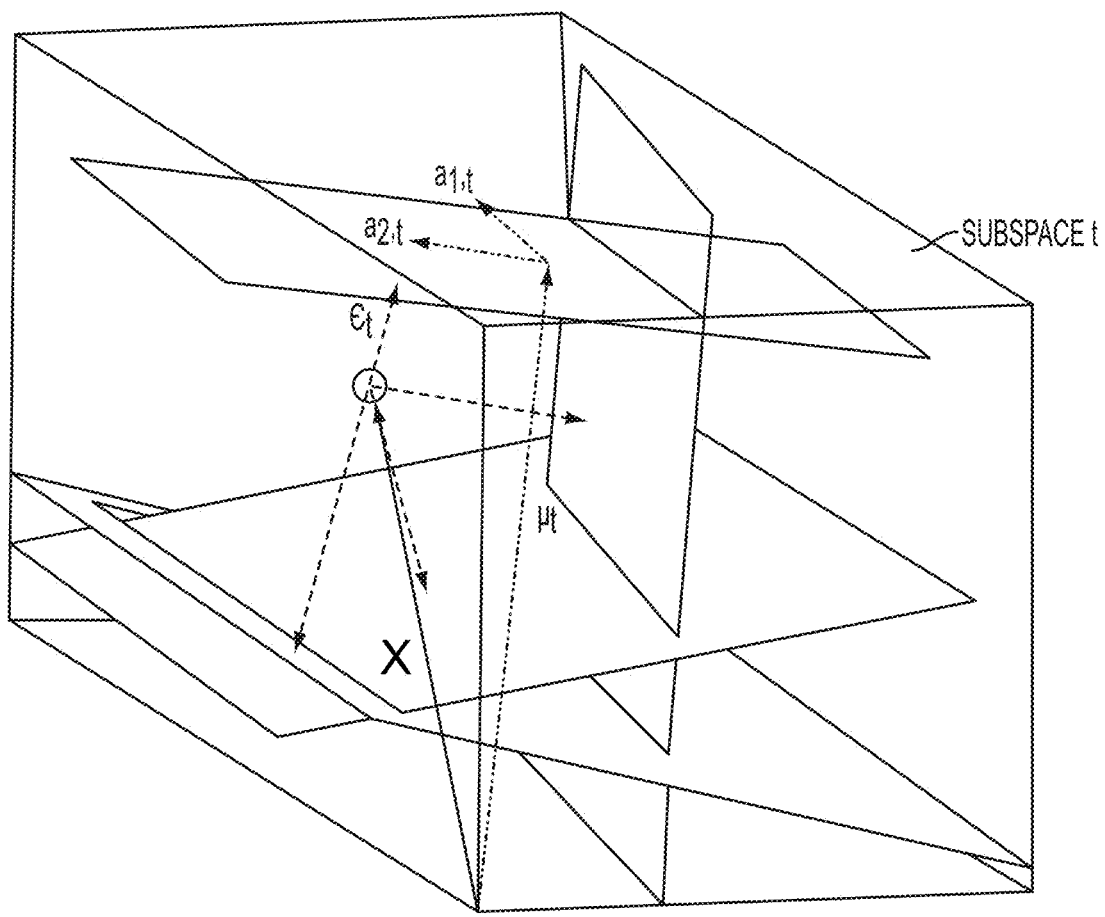
FIG. 4 depicts a union of subspaces for representing an image region according to some embodiments.

A vectorized image region, x, is illustrated in FIG. 4 as a union of subspaces according to certain embodiments. The union of subspaces is depicted as two dimensional overlapping planes, with each plane representing a subspace. The image region vector x can be represented as a combination of these subspaces by projecting vector x onto each plane. In this illustration, each two dimensional subspace plane may be represented by its local basis vectors. For example, subspace t is represented by the basis vectors $a_{1,t}$ and $a_{2,t}$. As depicted in FIG. 4, subspace t is offset from the origin of vector x. This offset is represented by subspace offset vector $\mu_t$. Modeling error $\epsilon_t$ is used to capture the fact that the image region does not lie perfectly in subspace t. Thus, a vectorized image region may be modeled as a point living close to a union of linear subspaces as follows:

$$x \in \cup_{t=1}^{T}(S_t + \epsilon_t)$$

where, $$S_t = \{A_t w + \mu_t; w \in \mathbb{R}^{d_t}\}$$

The matrix $A_t = [a_{1,t}, a_{2,t}, \ldots, a_{d_t,t}]$ is the matrix of basis vectors centered at $\mu_t$ for subspace index t, w is the coordinate of x at subspace t, and $\epsilon_t \sim \mathcal{N}(0, \sigma_\epsilon^2 I)$ is the modeling error.

The image region equation may be written, then, as:

$$x = A_t w + \mu_t + \epsilon_t$$

where, $$\hat{t} = \underset{t}{\operatorname{argmin}} \|P_{A_t}^{\perp}(x - \mu_t)\|_2$$

is the estimate for the subspace index closest to x.

In some embodiments, the learning machine for each layer of the DLC model is built using a mixture of factor analyzers (MFA), which can be thought of as a demarginalization of a Gaussian mixture model, to learn the union of subspaces. A Gaussian mixture model is a probabilistic model that assumes all the data points are generated from a mixture of a finite number of Gaussian distributions with unknown parameters. One can think of mixture models as generalizing k-means clustering to incorporate information about the covariance structure of the data as well as the centers of the latent Gaussians. The model is able to simultaneously cluster and do dimensionality reduction within each cluster. According to certain embodiments, a nonparametric version of an MFA is used to build the learning machine. Nonparametric models assume that the distribution of the training data cannot be defined by a finite number of parameters in advance. Therefore, nonparametric models determine the number of parameters from the training data. Certain embodiments use a Bayesian nonparametric version of the MFA described in Minhua Chen et al., *Compressive Sensing on Manifolds Using a Nonparametric Mixture of Factor Analyzers: Algorithm and Performance Bounds*, 58 IEEE Transactions on Signal Processing 12, 6140-55 (2010), which is incorporated herein by reference, in which the number of subspaces and subspace rank (dimensionality) are inferred from the data using Bayesian nonparametrics.

In some embodiments, a Dirichlet process mixture model is used to model the clusters. The Dirichlet process is a prior probability distribution on clusterings with an infinite, unbounded, number of partitions. Such techniques allow incorporation of prior structure on Gaussian mixture models at almost no penalty in inference time, compared to a finite Gaussian mixture model. The Dirichlet process does clustering with an unbounded number of mixture components by assuming a very asymmetrical prior structure over the assignments of points to components that is very concentrated. Variational inference techniques for the Dirichlet process still work with a finite approximation to this infinite mixture model, but instead of having to specify a priori how many components to use, only the concentration parameter and an upper bound on the number of mixture components need be specified (this upper bound, assuming it is higher than the "true" number of components, affects only algorithmic complexity, not the actual number of components used). In some embodiments, a Beta process is used to estimate the local subspace in each cluster.

Figure 5A:
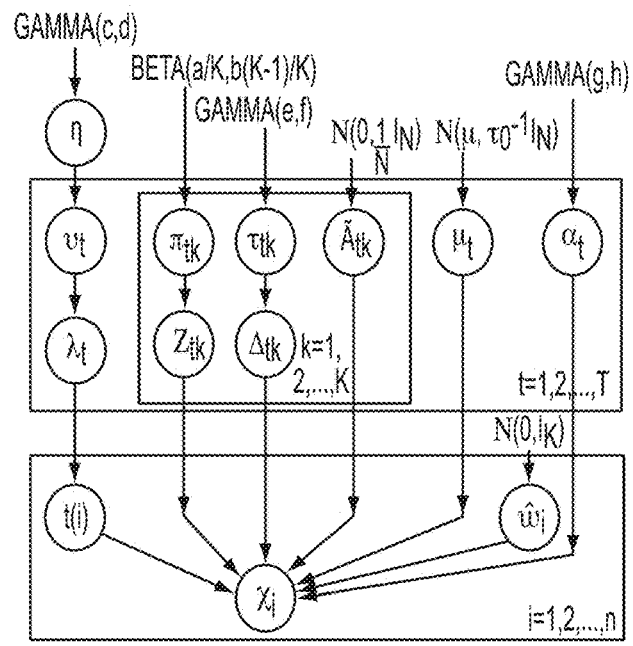
FIG. 5A is a directed graph representing a BNP-MFA learning machine according to some embodiments.
Figure 5B:
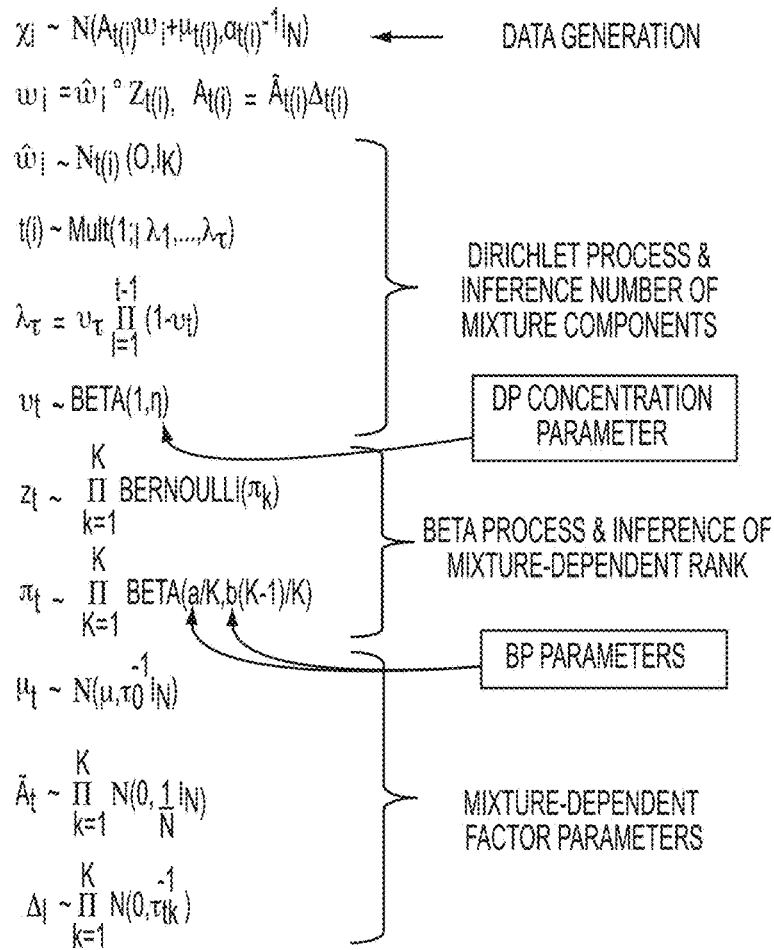
FIG. 5B is a description of the components of a BNP-MFA learning machine according to some embodiments.

FIG. 5A is a conjugate-exponential directed graphical model that illustrates a BNP-MFA according to certain embodiments. The full expansion of the model in equation form is given in FIG. 5B. In certain embodiments, the only parameters that need to be set are the Dirichlet process (DP) parameter 11 and the Beta process (BP) parameters a and b, which are illustrated in FIG. 5B. According to certain embodiments, DP concentration parameters may be 1-1000, and BP parameter ratio a/b may be in the range 0.01 to 100.

In some embodiments, each layer of DLC model learns a BNP-MFA density model at progressively increasing fields of view. For example, the first layer operates on 8×8 image regions, the second layer operates on 16×16 image regions, the third layer operates on 32×32 image regions, and so on. Each layer of the deep architecture is learned using the outputs of the previous layer. The method maps between image space and latent space to swap real regions with model generated regions at increasing fields of view.

Figure 6:
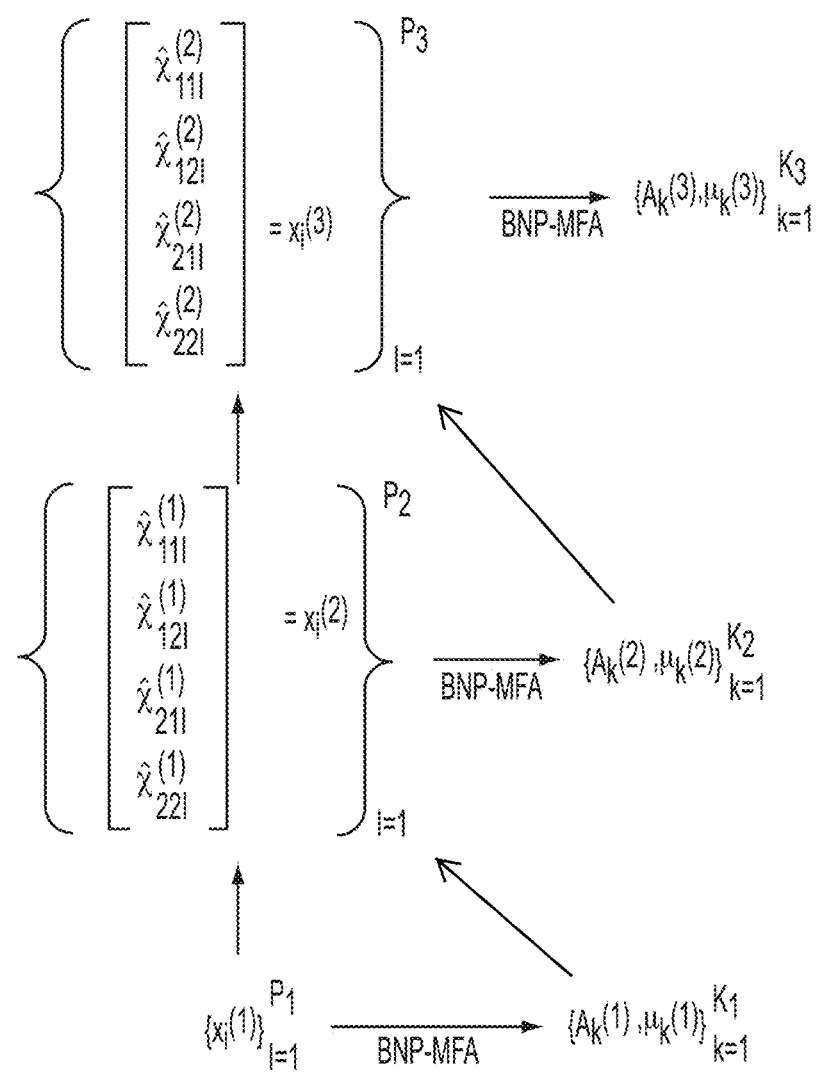
FIG. 6 is an illustration of the computations used in a deep learning compression method according to certain embodiments.
Figure 7:
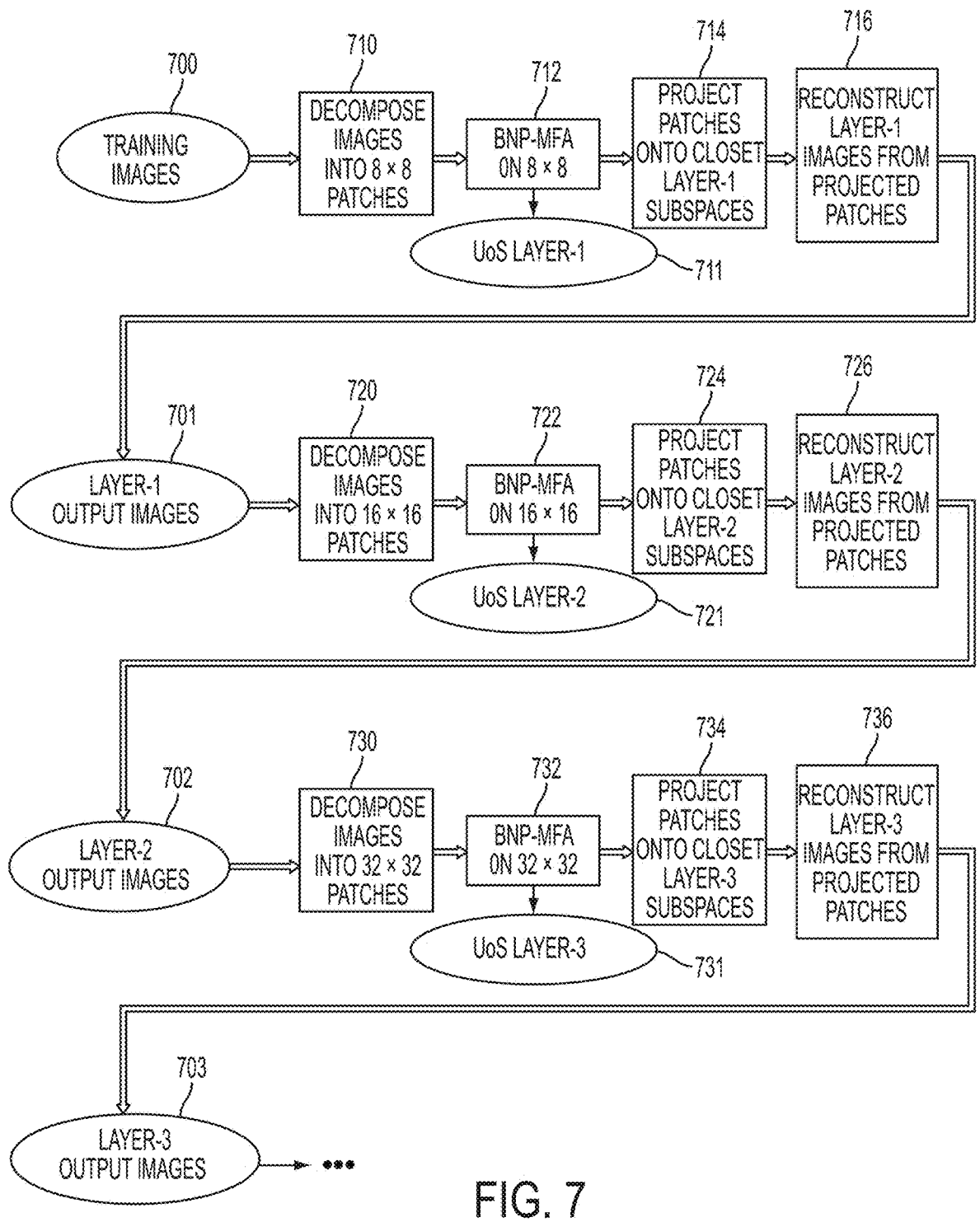
FIG. 7 is a flow diagram of the steps for machine learning model parameters according to certain embodiments.

FIG. 7 is a flow diagram illustrating the training of a DLC model according to certain embodiments. The computations used in the training process are illustrated in FIG. 6. The training of the DLC model begins by dividing each image in a set of training images 700 into regions at step 710. The collection of regions across all training images (set of $P_1$ image regions) is represented by $\{X_i^{(1)}\}_{i=1}^{P_1}$, where $X_i$ is a vector containing the pixel data in image region i. In some embodiments, the image regions are 8×8 regions that overlap and cover each training image. In some embodiments, the image regions overlap by 1 pixel. In some embodiments, the amount of overlap depends on the total number of pixels along a dimension of the image. In some embodiments, the amount of overlap varies from region to region.

An 8×8 image region contains 64 pixel values, and therefore, the vector representation of the 8×8 image region is a 64 dimensional vector with one dimension for each of the pixel values in the 8×8 region. In some embodiments, around 100 training images are used, resulting in several hundred thousand regions such that $P_1 \approx 500{,}000$. At step 712, a first layer BNP-MFA model is learned on those regions resulting in a learned set of $K_1$ subspace basis vectors and offsets $\{A_k^{(1)}, \mu_k^{(1)}\}_{k=1}^{K_1}$ representing the layer 1 union of subspaces 711. These subspace vectors and offsets are first layer machine learned model parameters used for compressing and decompressing digital image files. At step 714, the original image regions from a local 2×2 region (covering a 16×16 pixel region at that level) are projected onto the union of subspaces for those four image regions at each image region spatial location i, using:

$$\hat{x}_{mni}^{(1)} = P_{A_k^{(1)}} x_{mni}^{(1)} + P_{A_k^{(1)}}^{\perp} \mu_k^{(1)} \quad m=1,2 \; n=1,2$$

where $P_{A_k^{(l)}}$ is the projection matrix for $A_k^{(l)}$ and $P_{A_k^{(l)}}^\perp$ is the orthogonal complement. The training images are reconstructed from the projected regions at step 716 resulting in layer 1 output images 711. At step 720, four 64×1 vectors (four 8×8 reconstructed image regions) are concatenated into a single 256×1 vector to generate a set of $P_2$ image region vectors $\{X_i^{(2)}\}_{i=1}^{P_2}$ ($\forall_i = 1, 2, \ldots, P_2$), where $P_2 \leq P_1$. Then, at step 722, a second layer BNP-MFA model is learned on this set of 256×1 vectors resulting in a learned set of $K_2$ subspace basis vectors and offsets $\{A_k^{(2)}, \mu_k^{(2)}\}_{k=1}^{K_2}$ representing the layer 2 union of subspaces 721. These subspace vectors and offsets are second layer machine learned model parameters used for compressing and decompressing digital image files. At step 724, the process proceeds as before where the reconstructed image regions from a local 4×4 reconstructed region (covering a 32×32 pixel region at that level) are projected onto the union of subspaces for those eight image regions at each image region spatial location i. The training images are reconstructed a second time from the projected regions at step 726 resulting in layer 2 output images 712. At step 730, four 256×1 vectors are concatenated together to create a set of $P_3$ 1024×1 image region vectors $\{X_i^{(3)}\}_{i=1}^3$ at layer 3. Then, a third layer BNP-MFA model is learned on this set of 1024×1 vectors, at step 732, resulting in a learned set of $K_3$ subspace basis vectors and offsets $\{A_k^{(3)}, \mu_k^{(3)}\}_{k=1}^{K_3}$ representing the layer 3 union of subspaces 731. These subspace vectors and offsets are third layer machine learned model parameters used for compressing and decompressing digital image files. At steps 734 and 736, the reconstructed image regions from the output of the previous layer are projected on the closest layer 3 subspaces and a set of layer 3 image are reconstructed from the projected image regions to serve as inputs to a next layer of the machine learning model.

According to certain embodiments, this process continues for additional layers until the BNP-MFA model layer fails to find meaningful low-dimensional structure in the data. The hard limit on the number of layers is reached when region size equals or exceeds image size, but the number of levels may be stopped well before that point when the modeled image patches begin to deviate too far in terms of distortion from the previous layer. Often, the number of levels is stopped when the region size reaches around 128×128 pixels (corresponding to five levels if starting patch size is 8×8 and the field of view is expanded by a factor of two in row and column at each succeeding level). In some embodiments, two or three levels are enough to get good compression ratios and minimal image distortion. Each layer works off of the slightly distorted version of the original image where large distortions only occur in areas with low probability. In other words, features that do not appear often in the set of training images, and therefore have low probability, will be distorted, but features that occur often throughout the training images will be well modeled even at large fields of view.

In some embodiments, the number of levels learned is predetermined. In some embodiments, the process dynamically determines the number of levels based on whether meaningful low-dimensional structure is found.

Figure 13:
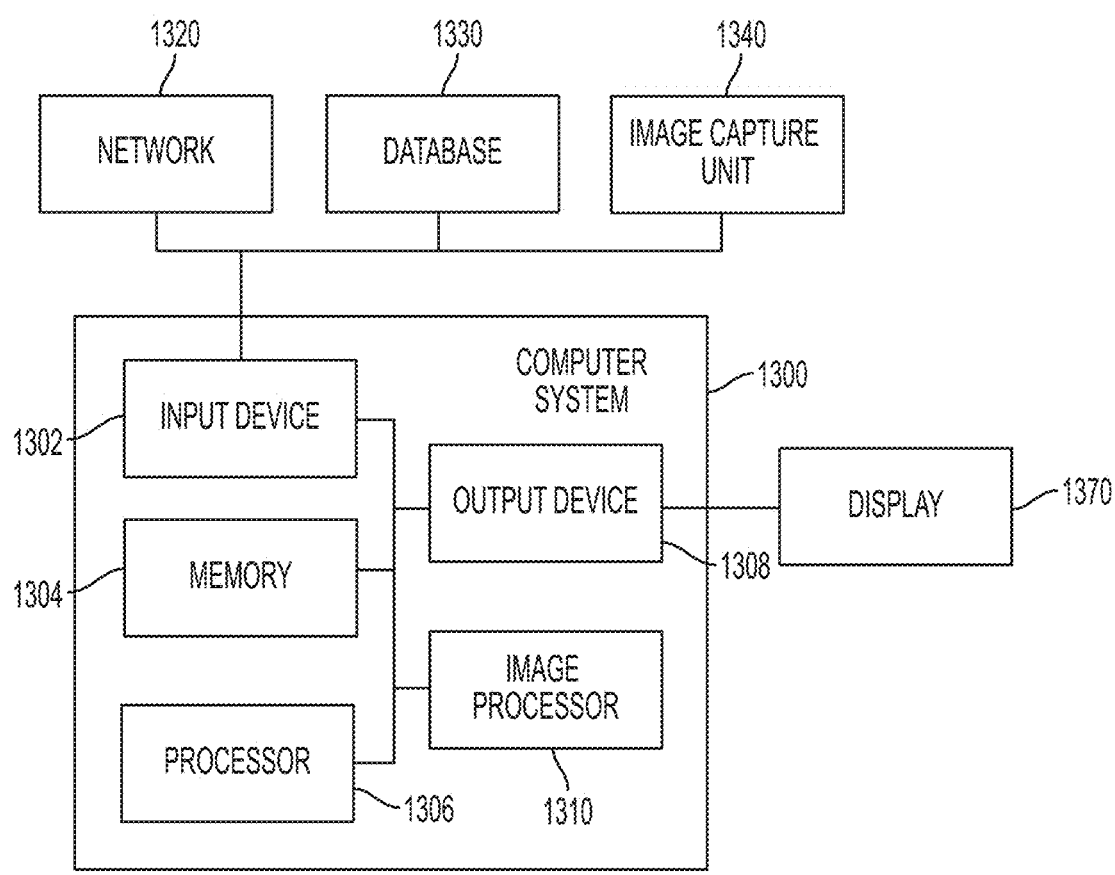
FIG. 13 is an illustration of a computer system according to some embodiments.

FIG. 13 is a computer system according to one embodiment of the present invention. The computer system 1300 comprises an input device 1302, a memory 1304, a processor 1306, an output device 1308, and an image processor 1310. The input device 1302 is coupled to a network 1320, a database 1330, and an image capture unit 1340. The output device 1308 is coupled to a database 1350, a network 1360, and a display 1370. In other embodiments, the input device is connected to only one or two of a network 1320, a database 1330, and an image capture unit 1340. In yet another embodiment, the input device may be connected to any device configured to input data to the computer system. Similarly, in some embodiments, the output device may be connected to one or more of a database 1350, network 1360, display 1370 or any other device cable of receiving outputted data. In another embodiment, the computer system comprises one or more of a processor 1306, an image processor 1310, or other specialized processor.

In some embodiments, computer system 1300 generates the machine learned model parameters used to compress and decompress digital image files. A learning machine for learning the model parameters according to certain embodiments is stored in memory 1304. Computer system 1300 loads and initializes the learning machine using processor 1306. In certain embodiment, initializing the learning machine includes setting parameters required for running the learning machine. In certain embodiments, for example, those using a BNP-MFA learning machine, initializing the learning machine includes setting the Dirichlet process parameter 11 and the Beta process parameters a and b. A set of training data in the form of digital images may be stored in database 1330 and loaded into memory 1304. In some embodiments, training images are downloaded from another computer system to computer system 1300 through network 1320 and input device 1302. In some embodiments, training data is generated through image capture unit 1304 and stored in database 1330 and/or memory 1304. After loading the training images and initializing the learning machine, computer system 1300 partitions the training images into image regions using processor 1306. Processor 1306 executes the learning machine using the partitioned training images as inputs to the first layer of a learning machine, as discussed above. Executing the learning machine using the partitioned training images results in a set of machine learned model parameters for use in compressing images. In certain embodiments, processor 1306 executes a multi-layered learning machine resulting in several sets of machine learned model parameters, with each set corresponding to a layer of the learning machine. In certain embodiments, one of the parameters used to initialize the learning machine sets the number of layers of the learning machine. For example, the parameter may be set to one, two, three, or four, and the learning machine runs one layer, two layers, three layers, or four layers, respectively, resulting in one set of model parameters, two sets of model parameters, three sets of model parameters, or four sets of model parameters, respectively. In some embodiments, the number of levels is more than four. In some embodiments, the learning machine automatically determines the number of levels based on the data. The learned model parameters may be stored in memory 1304. In certain embodiments, computer system 1300 incorporates the learned model parameters into an image compression application that may be used by computer system 1300 and/or other computer systems to compress and decompress images. In certain embodiments, the application is stored on a removable computer readable storage medium, such as an optical disc, a memory card, or an external hard disk drive. In some embodiments, the application may be downloaded from computer system 1300 over network 1320 and stored on an end-user computer system to be executed by the end-user to compress and decompress digital image files.

Compressing and Decompressing Based on the Deep Learning Compression Model

Figure 8:
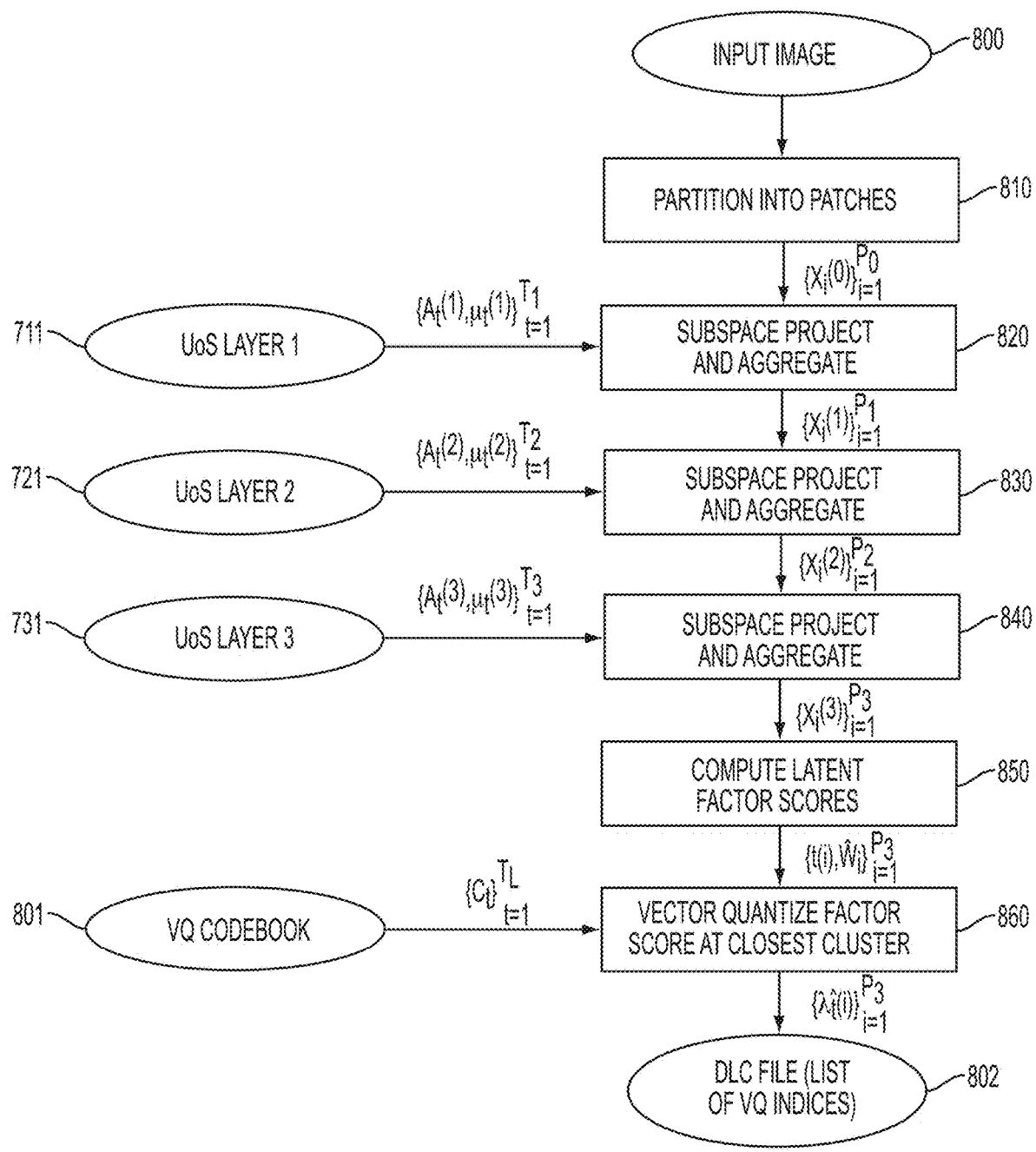
FIG. 8 is a is a flow diagram of the steps for compressing a digital image file according to certain embodiments.
Figure 9:
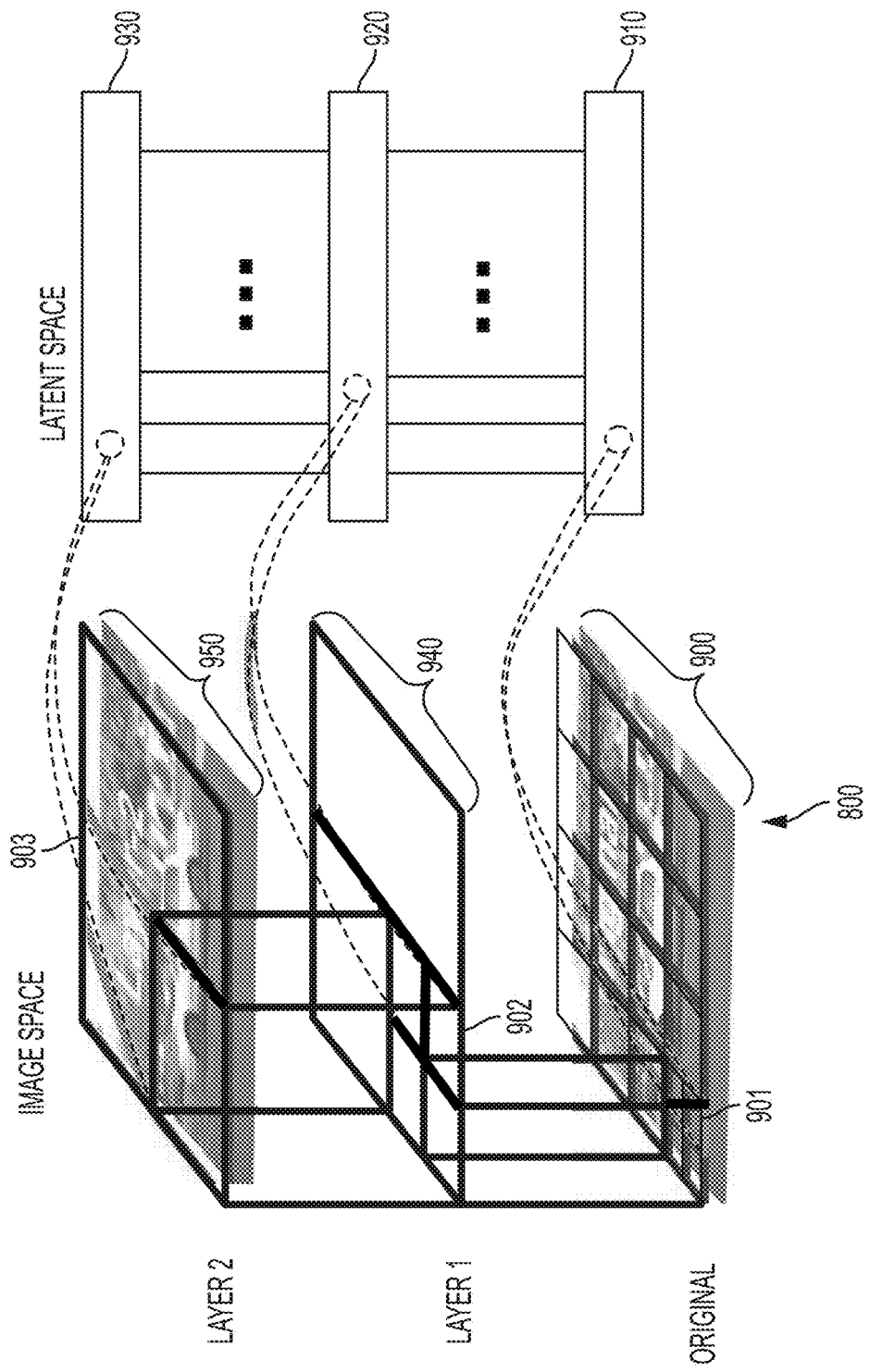
FIG. 9 is an illustration of the process of compressing a digital image file according to certain embodiments.
Figure 10:
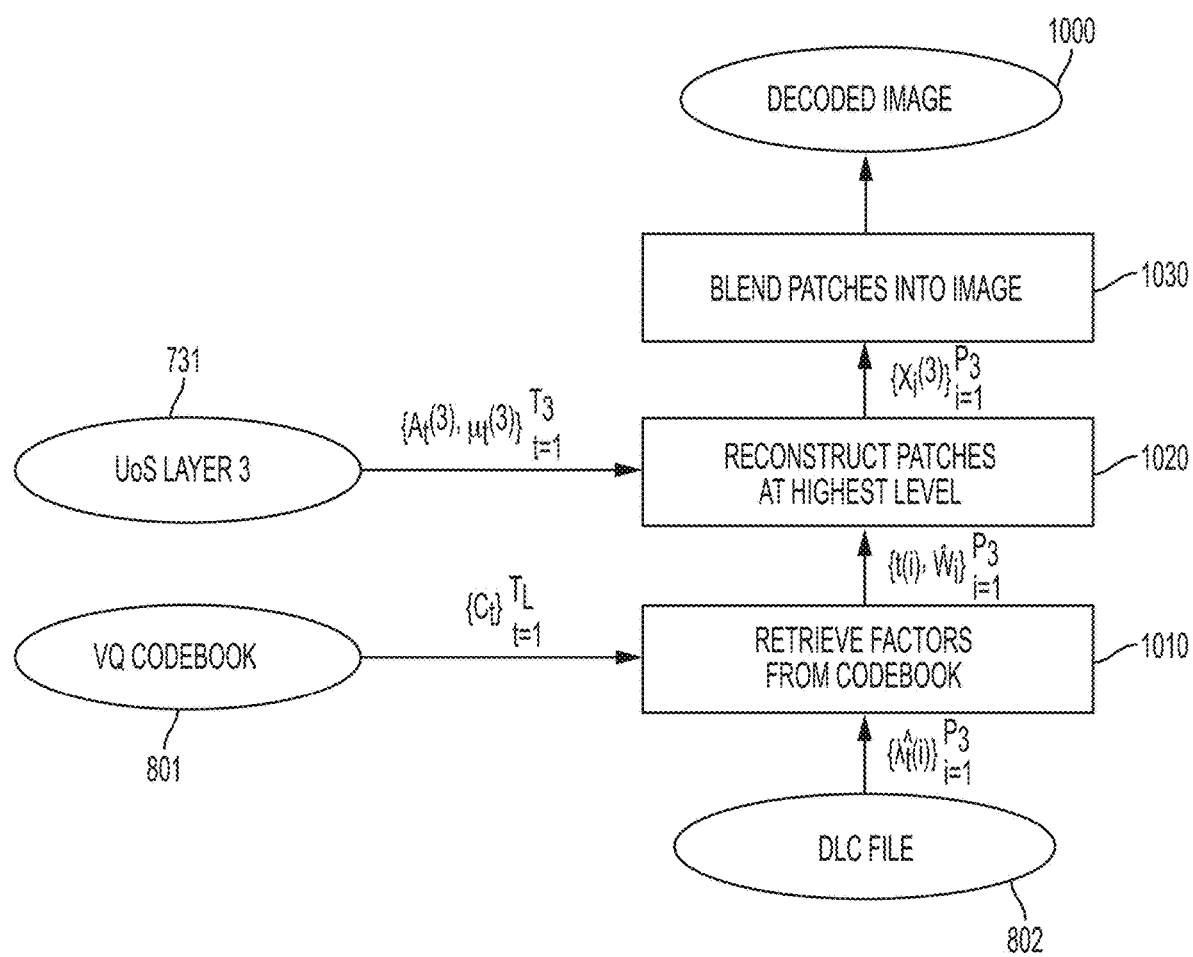
FIG. 10 is a is a flow diagram of the steps for decompressing a digital image file according to certain embodiments.

After the bases $A_t^{(l)}$ and offsets $\mu_t^{(l)}$ have been learned for all subspaces at all levels ($\forall$ t, l), the deep learning compression model is fully generated and can be used to encode and decode (compress and decompress) a digital image. The compression and decompression methods store and apply the bases and offsets during the encoding and decoding stages. The steps involved in image encoding (compression) according to certain embodiments are shown in FIG. 8 and the image decoding (decompression) steps are shown in FIG. 10. Encoding follows a similar process as the deep learning modeling method described above, except that the union of subspaces (and the associated machine learned model parameters) at each level is already learned. The encoding and decoding processes illustrated in FIGS. 8, 9, and 10 represent an embodiment using three layers of machine learned model parameters. Fewer levels or greater levels are also contemplated and follow similar steps. In certain embodiments, the number of levels of model parameters determines the level of compression, and the number of levels is adjustable and may be set by a user. In some embodiments, the number of levels is fixed.

In FIG. 8, input image 800 is a digital image file consisting of an array of pixel intensities (see, e.g., FIG. 1). Input image 800 may be square (the same number of pixels in each dimension of the array) or rectangular. The input image may be any size, including up to multiple millions of pixels. The input image may be any aspect ratio. At step 810, the input image is partitioned into regions. FIG. 9 illustrates an example of an input image 800 with a grid covering the image, which represents partitioning of the input image 800 into regions 900 that include region 901. In some embodiments, the regions are square regions (m×m) and in certain other embodiments, the regions are rectangular (m×n). In some embodiments, each image region overlaps at least one other image region. In some embodiments each image region overlaps each of its neighboring image regions. In some embodiments, the overlap is one pixel. In other embodiments, the regions overlap each other by more than one pixel. In some embodiments, the image is partitioned into 8×8 image regions with each region overlapping other regions. In some embodiments, the size of the image regions are the same as the image regions used in the learning machine to learn the model parameters as described above. In some embodiments, the size of the regions is different from those used in the training process. The result of the partitioning step is a set of image region vectors $\{X_i^{(0)}\}_{i=1}^{P_0}$.

At step 820, these image region vectors are projected onto the layer 1 union of subspaces of the deep learning image compression model such that each vector is represented as a combination of the layer 1 subspace vectors and offsets $\{A_t^{(1)}, \mu_t^{(1)}\}_{t=1}^{T_1}$. FIG. 9 illustrates that the image region 901 is converted into latent (model) space, with latent space first layer 910 representing the layer 1 union of subspaces described by subspace vectors and offsets 711 $\{A_t^{(1)}, \mu_t^{(1)}\}_{t=1}^{T_1}$. The transformed image region vectors from a 2×2 image region are then aggregated in a single vector, with the set of combined vectors being the set of image region vectors $\{X_i^{(1)}\}_{i=1}^{P_1}$. FIG. 9 illustrates that the second level image regions 940, including region 902, are combinations of four adjacent regions of the input image regions 900.

At step 830, the same process is repeated using the set of image region vector generated at step 820 as the input. The set of image region vectors $\{X_i^{(1)}\}_{i=1}^{P_1}$ are projected onto the layer 2 union of subspaces of the deep learning image compression model such that each vector is represented as a combination of the layer 2 subspace vectors and offsets 721 $\{A_t^{(2)}, \mu_t^{(2)}\}_{t=1}^{T_2}$ (as illustrated by latent space second layer 920 in FIG. 9). The transformed image region vectors from a 2×2 image region are then aggregated in a single vector, with the set of combined vectors being the set of image region vectors $\{X_i^{(2)}\}_{i=1}^{P_2}$ (as illustrated in layer 2 image regions 950).

At step 840, the process is repeated once more. The set of image region vectors $\{X_i^{(2)}\}_{i=1}^{P_2}$ generated at step 830 are projected onto the layer 3 union of subspaces of the deep learning image compression model such that each vector is represented as a combination of the layer 3 subspace vectors and offsets 731 $\{A_t^{(3)}, \mu_t^{(3)}\}_{t=1}^{T_3}$ (as illustrated by latent space third layer 930 in FIG. 9). The transformed image region vectors from a 2×2 image region are aggregated in a single vector, with the set of combined vectors being the set of image region vectors $\{X_i^{(3)}\}_{i=1}^{P_3}$.

At step 850, the image-specific information is extracted from level-3 set of image region vectors $\{X_i^{(3)}\}_{i=1}^{P_3}$ based on the relationship between image region vector X and bases $A_t^{(l)}$ and offsets $\mu_t^{(l)}$ based on the following relationships:

$$x = A_{\hat{t}} w + \mu_{\hat{t}} + \epsilon_{\hat{t}}, \hat{t} = \operatorname*{argmin}_t \|P_{A_t}^\perp (x - \mu_t)\|_2$$

The input image-specific information is contained in the latent factor scores w. At step 850, estimations of these latent factor scores are computed resulting in a set of latent factor score estimations $\hat{w}_i$ for each subspace t(i) to produce $\{t(i), \hat{w}_i\}_{i=1}^{P_3}$.

At step 860, the computed latent factor scores are vector quantized based on vector quantization codebook 801. Vector quantization, generally, is a process for replacing vectors from an input set with vectors from a much sparser set. By replacing the input vectors with vectors from the sparse set and storing just indices into that set, a much more compact representation of the image is possible. The set of possible quantized values for the vectors is called a "codebook." Vector quantization can be done in any number of ways that a clustering algorithm can be done. According to certain embodiments, the vector quantization codebook is built by picking the hyper-parameters of a clustering model to force large numbers of clusters with low dimension and use the subspace mean as the cluster center. The index to each cluster center is a word in the vector quantization codebook. In these embodiments, the number of clusters corresponds to the number of code words. According to certain embodiments, the union of subspaces is used to do hierarchical clustering by first finding the subspace index to determine which sub-codebook to use and then vector quantizing each subspace independently.

In some embodiments, the vector quantization codebook 801 includes only the top layer (layer 3, in the embodiment of FIG. 8) of the machine learned model parameters. In some embodiments in which the number of levels of the machine learned model parameters are adjustable in the compression process, the vector quantization codebook includes multiple layers of the machine learned model parameters. Including only the top layer may reduce the memory and processing power required to store and run the image compression application. Including multiple layers allows for tunable levels of compression.

The latent factor scores are vector quantized at the closest cluster to produce a deep learning compression (DLC) file 802, which is a list of the vector codebook indices $\{\lambda_i(i)\}_{i=1}^{P_3}$. The DLC file 802 is the compressed file of the original digital image 800. The DLC file 802 is much smaller in the amount of data it contains relative to the input image file 800 and, therefore, requires less storage space to store and less bandwidth and transfer time to transmit from computer to computer over a network or from device to device. The size of the DLC file 802 may be significantly less than a JPEG compressed file of the input image file 800 at the same or similar levels of distortion. The DLC file may produce much better image quality than a comparably compressed (same or similar compression ratio) JPEG file. Additionally, the DLC file may be compressed to levels unachievable using a JPEG compression application.

According to certain embodiments, instead of vector quantizing the latent factor scores at the top level of the deep learning compression model as described above with respect to step 860, latent factor scores, latent subspace indices, and residual error vectors for each layer may be stored during the encoding stage using scalar quantization. Storing these parameters at each layer allows the decompression process to "work back down the stack," recursively reconstructing the model patches at each layer from the top layer down to the bottom layer. This method may incur larger file storage requirements (i.e., lower compression ratio), but may provide less distortion and greatly improve the speed of compression and decompression (encoding and decoding) due to the use of scalar quantization versus vector quantization. For example, for an image file compressed using a two layer machine learning compression according to certain embodiments, the compressed image file may include scalar quantized latent factor scores, latent subspace indices, and residual error vectors for each of the two layers. During decompression, the latent factor scores, latent subspace indices, and residual error vectors for a top layer are combined with the subspace vectors and offsets for that top layer to produce first layer image region vectors $\{X_i^{(1)}\}_{i=1}^{P_1}$. Combining these first layer image region vectors with the latent factor scores, latent subspace indices, and residual error vectors for the bottom layer produces the set of image region vectors $\{X_i^{(0)}\}_{i=1}^{P_0}$. Blending these image region vectors produces the de-compressed image file.

The above described compression method may be performed by various computing devices including a general purpose computer system such as computer system 1300 shown in FIG. 13. Basis vectors $A_t^{(l)}$ and offset vectors $\mu_t^{(l)}$ generated by a learning machine, as described above, may be built into an image compression application stored in memory 1304. A user may select a digital image (eg, stored in database 1330 or memory 1304, obtained from image capture unit 1340, or downloaded through network 1320) for compression and processor 1306 runs the image compression application on the selected digital image according to the process described above. Once the digital image is compressed, the compressed file may be stored in memory 1304, database 1330, or transferred to another computing device through network 1320.

According to certain embodiments, the level of compression is adjustable by a user. A compression level parameter set by the user may determine the number of layers of machine learned model parameters that the compression process uses. In some embodiments, the compression level may be adjusted by changing vector quantization parameters. In some embodiments, both the number of layers of machine learned model parameters and vector quantization parameters may be adjusted to fine tune the level of compression. In some embodiments, the compression process includes an estimation of the quality of the compressed image and the number of layers of machine learned model parameters and/or the vector quantization model parameters are automatically or dynamically adjusted to tune the amount of compression based on a desired compressed image quality.

Decompressing an image file, according to certain embodiments, is similar to the compression process in reverse. Decompressing a compressed image file requires the compressed image file, consisting of codebook indices as described above, a codebook containing the quantized values for the machine learned model parameters, and the basis vectors and offsets used in the compression process. In certain embodiments, decompression requires only a top layer of basis vectors and offsets.

An embodiment of the decompression process is illustrated in FIG. 10. The DLC file 802, the vector quanization codebook 801, and the layer 3 machine learned model parameters 731 are inputs to this decompression process. At step 1010, factors from vector quantization codebook 801 are retrieved based on the vector quantization indices $\{\lambda_i(i)\}_{i=1}^{P_3}$ stored in the DLC file 802. The retrieved factors $\{t(i), \hat{w}_i\}_{i=1}^{P_3}$ are then used at step 1020 to reconstruct image regions at the highest level using the layer 3 basis vectors and offsets 831 $\{A_t^{(3)}, \mu_t^{(3)}\}_{t=1}^{T_3}$. Step 1020 results in the set of image region vectors $\{X_i^{(3)}\}_{i=1}^{P_3}$. These image region vectors are blended into decoded image 1000.

According to certain embodiments, instead of creating the decompressed image file based on vector quantized latent factor scores from a top level of a deep learning compression model, as described above, the decompressed image file may be created based on scalar quantized latent factor scores, latent subspace indices, and residual error vectors for each layer used in the compression process. Using these scalar quantized parameters at each layer enables the decompression process to "work back down the stack," recursively reconstructing the model patches at each layer from the top layer down to the bottom layer. This method may provide less distortion and greatly improve the speed of decompression (decoding) due to the use of scalar quantization versus vector quantization.

The above described decompression method may be performed by various computing devices including a general purpose computer system such as computer system 1300 shown in FIG. 13. The vector quantization codebook 801 and the layer 3 learned model parameters 731, as described above, may be built into an image decompression application stored in memory 1304 or built into special purpose hardware. According to certain embodiments, a user selects a DLC compressed digital image file (eg, stored in database 1330 or memory 1304, obtained from image capture unit 1340, or downloaded through network 1320) for decompression and processor 1306 executes the image compression application on the selected compressed digital image file according to the process described above. Once the digital image is decompressed, the decompressed image may be stored in memory 1304, database 1330, transferred to another computing device through network 1320, or displayed on display 1370.

According to certain embodiments, the image decompression application includes multiple layers of machine learned model parameters and the associated vector quantization codebook information. This allows for decompression of files with varying levels of compression according to certain embodiments of the compression methods described above. For example, where one digital image file has been compressed using two layers of a machine learned model and a second digital image file has been compressed using three layers of the machine learned model, the decompression application is able to decompress both images by applying the layer two machine learned model parameters and associated vector quantization codebook information to the first image and the layer three machine learned model parameters and associated vector quantization codebook information to the second image. In certain embodiments, a DLC compressed file includes information of the compression process used. For example, the file includes information about the number of layers used and the parameters used in vector quantization. In certain embodiments, this information is inherent in the list of vector quantization indices stored in the DLC file (i.e., no additional information need be included in the DLC file other than the vector quantization indices).

According to some embodiments, the compression and decompression methods are incorporated into a single application. In some embodiments, the decompression method is included in a stand-alone decompression application.

As previously described, grayscale digital images typically include one intensity value for each pixel. In certain embodiments, the learning machine is trained on grayscale training images. The machine learned model parameters are then used to compress and decompress grayscale digital images according to the processes described above. Color digital images are typically composed of three color layers—red, green, and blue (RGB). Each pixel in the array pixels of a color digital image file contains information specific to the red, green, and blue layers. In certain embodiments, a learning machine is trained on color images. In some of these embodiments, the learning machine is trained without altering the training image data, such that the vector representations of the image regions, as described above, each contain information for the red, green, and blue color layers. In other embodiments, the RGB layers are separately processed with the learning machine learning model parameters for each color layer individually. In these embodiments, each set of machine learned model parameters (for each layer of the learning machine) contains model parameters dedicated to the red layer, blue layer, and green layer, respectively. Certain other embodiments take advantage of the fact that the red, green, and blue layers of color digital images typically have redundant information. RGB color digital images can be transformed into an intensity layer and two color layers (typically referred to as YCbCr, Y'CbCr, or YUV). The intensity layer is similar to a grayscale image and contains the majority of the information. The two color layers typically contain much less information. In some embodiments, the learning machine is trained on the intensity layer of color images and not on the color layers. According to these embodiments, training images that include RGB values are first converted to an intensity layer and two color layers and the learning machine is trained only on the intensity layer. In certain other embodiments, the learning machine is trained on each of the intensity/color layers separately or jointly, resulting in three sets of model parameters for each layer of the learning machine.

Typically, transformation of a color image from RGB to YCbCr results in a doubling of the input dimension to the machine learning methods described above relative to a grayscale image because Cb and Cr channels are typically twice-downsampled. Without transforming from RGB to YCbCr, the input dimension is tripled compared to grayscale. Therefore, conversion from RGB space to YCbCr space is generally favored for compression.

In embodiments in which the learning machine is trained on color images without separating out the RGB information or converting the RGB information, the compression and decompression processes include the steps described above.

In embodiments in which the learning machine is trained on the RGB layers separately, the compression process includes the step of separating a color digital image into the RGB components and applying the machine learned model parameters for each color layer separately, with the set of model parameters associated with the red layer applied to the red layer of the image, the set of model parameters associated with the blue layer applied to the blue layer of the image, and so on. The decompression process in these embodiments similarly includes the step of applying the separate RGB model parameters and includes the additional step of recombining the RGB layers into the conventional RGB digital image file. In embodiments in which the training process includes first converting color training images into intensity and color layers, the compression process includes the step of converting the color image to be compressed into intensity and color layers. In certain image compression embodiments, the machine learned model parameters are applied only to the intensity layer in accordance with the process described above. The color layers are then compressed using conventional compression methods. The decompression embodiments associated with these embodiments include the step of decompressing the color layers according to the conventional method used for compression and the step of converting back to the RGB space. In embodiments in which machine learned model parameters were learned for each of the intensity and color layers, the associated compression process includes the steps of converting the file to be compressed into the intensity and color layers and applying the associated model parameters to the individual layers. The decompression process in these embodiments similarly includes the step of applying the separate intensity and color model parameters to the intensity and color layers and the additional step of converting the intensity and color layers back to the conventional RGB digital image file format.

Machine Learning Compression System

Figure 14:
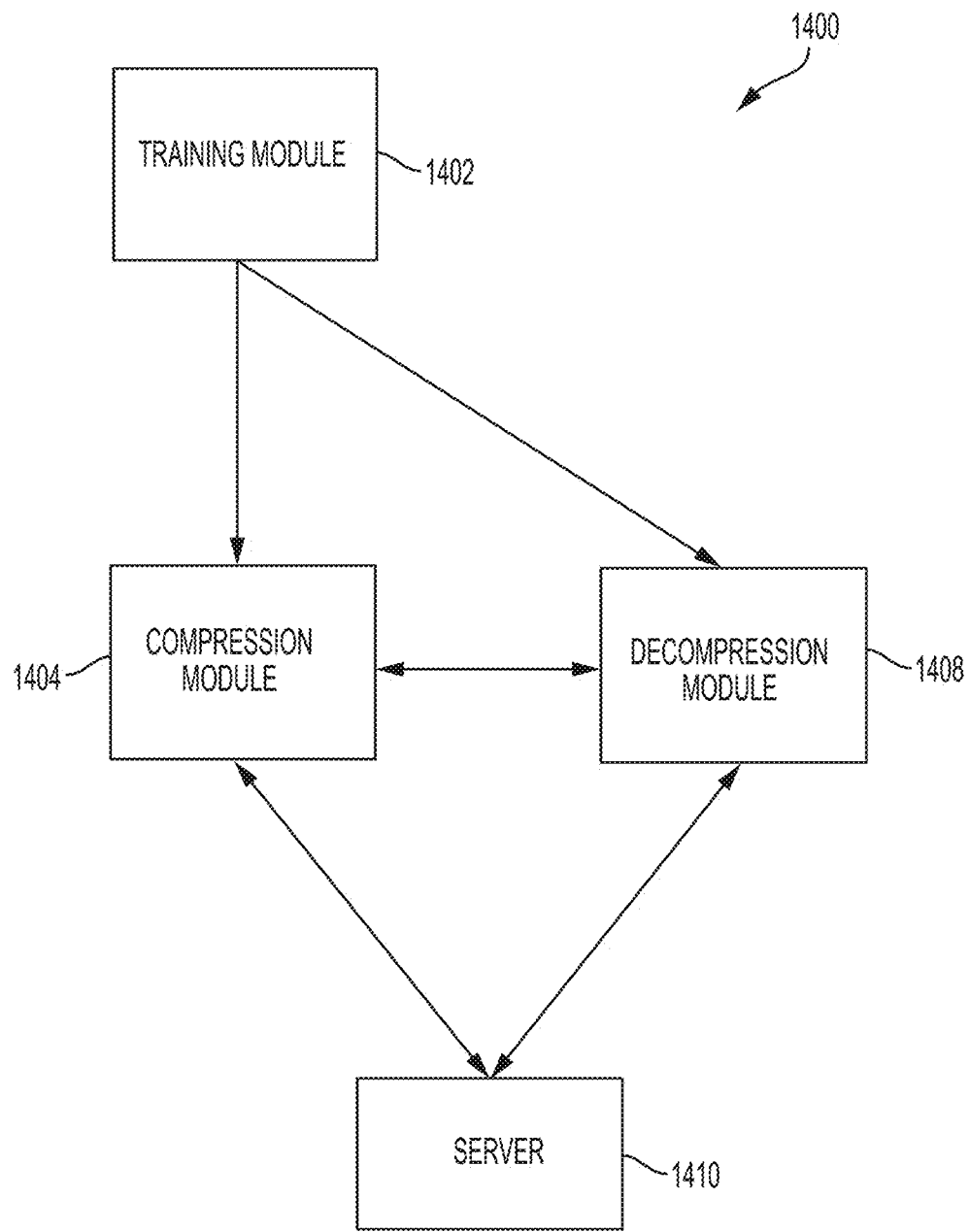
FIG. 14 is an illustration of a machine learning compression system according to certain embodiments.

FIG. 14 illustrates machine learning compression system 1400, according to certain embodiments, for generating image compression machine learned model parameters and using the parameters to compress and decompress digital image files. Machine learning compression system 1400 includes a training module 1402 for training an image compression learning machine model and one or more compression modules 1404 for compressing a digital image based on the machine learned model parameters. In certain embodiments, machine learning compression system 1400 includes one or more decompression modules 1408 for decompressing a compressed image file in accordance with the processes described above. Training module 1402, compression module 1404, and decompression module 1408 may be included in the same computing device or computing system, such as a desktop or laptop computer, or may be included in separate computing devices or systems. According to certain embodiments, the system includes multiple training modules 1402, multiple compression modules 1404, and/or multiple decompression modules 1408. In certain embodiments, the system includes one or more compression modules 1404 and one or more decompression modules 1408.

According to certain embodiments, training module 1402 initializes and trains a machine learning model on a set of training images resulting in sets of machine learned model parameters for each layer of the learning machine. The set of training images may be stored on a memory in training module 1402 or may be stored in a separate memory. The model parameters generated by training module 1402 may be built into an image compression/decompression application, which when executed compresses digital image files at ratios far exceeding conventional image compression techniques. In certain embodiments, machine learned model parameters are built into a stand-alone decompression application that does not include compression functionality, which when executed allows for a file compressed according to the methods described herein to be decompressed and rendered on a display. The stand-alone decompression application may require less storage space and processing power to execute, allowing users the ability to decompress a file compressed according to the described embodiments, without having to install a compression application. In certain embodiments, the image compression/decompression application may be stored on a removable storage device and may be transferred to a user for installation on the user's computing system or device. In certain embodiments, the image compression/decompression application is stored on server 1410 and transferred to a user's computing system or device over a network. The user installs the image compression/decompression application on their computing system or device and executes it to compress and decompress a digital image.

Compression module 1404, according to certain embodiments, applies the machine learned model parameters generated by the training module and the vector quantization in accordance with the above described processes, resulting in a DLC file. The DLC file may be stored on a memory of the user's computing system, stored on a removable storage medium, and/or transferred to another computing system, computing device, or server 1410 over a network, such as a local area network (LAN). Server 1410 may be an internet server or some other server for storing data and may not have compression module 1404 or decompression module 1408 installed. In certain embodiments, the compressed DLC file is transferred to another user's system. A user may install and execute a compression/decompression application that includes compression module 1404 and decompression module 1408 or a stand-alone decompression application that includes only decompression module 1408 according to embodiments described above. Alternatively, the compression/decompression functionality may be embodied in hardware or firmware on a user's system.

Decompression module 1408, according to certain embodiments, decompresses a DLC file by applying the machine learned model parameters generated by the training module and the vector quantization codebook generated by the compression module in accordance with the processes described above. The result of the decompression process is an array of pixel intensities that reconstructs the original digital image. This array may be rendered on a user's display or stored on the user's computing system or device.

Comparison to JPEG

Figure 11:
FIG. 11 is an illustration comparing the performance of JPEG compression to the performance of deep learning compression according to certain embodiments.
Figure 12:
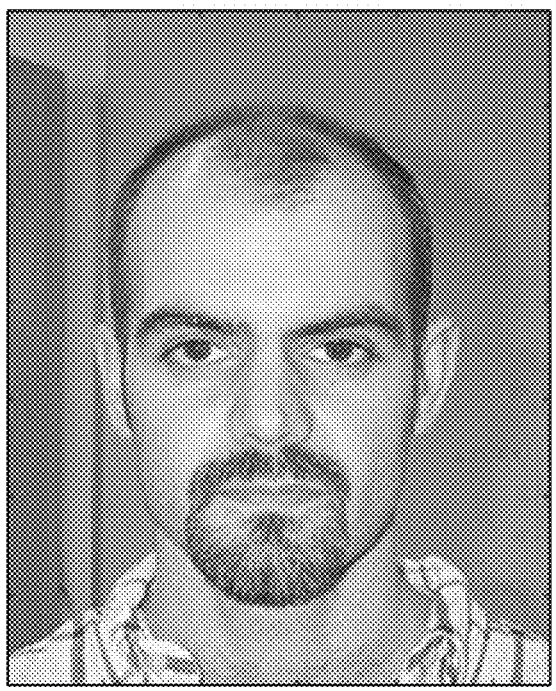
FIG. 12 is an illustration of the compression performance of deep learning compression according to certain embodiments.
Figure 12:
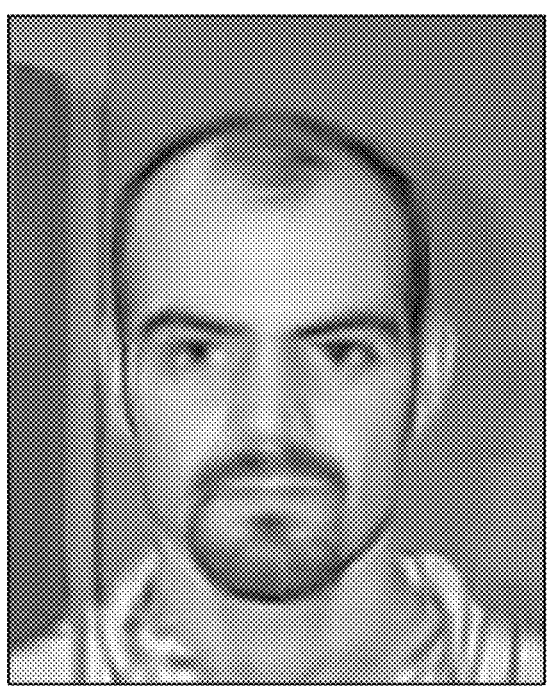

Compression and decompression results of deep learning image compression according to certain embodiments are compared to standard JPEG compression based on the Caltech-101 image dataset described in Li Fei-fei, *Learning Generative Visual Models From Few Training Examples: An Incremental Bayesian Approach Tested On 101 Object Categories,* 106 Computer Vision and Image Understanding 1, 59-70 (2007), which is incorporated herein by reference, for the DLC model training. First, as shown in FIG. 11, the results of deep learning compression according to methods described herein are compared against the standard DCT-based lossy JPEG image compression standard by holding the compression ratio fixed (both the DLC and JPEG methods apply the same compression ratio) and comparing the resulting reconstruction distortion. Second, as shown in FIG. 12, the DLC method is applied with the compression ratio set far beyond the maximum achievable with JPEG (quality factor set to 1%) and the distortion in the resulting reconstructed image is computed. The quality of the compressed image is compared to the original image using the structural similarity (SSIM) index which is defined as $$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $$\mu_x = \sum_{i=1}^{N} v_i x_i$$

$$\mu_y = \sum_{i=1}^{N} v_i y_i$$

$$\sigma_x^2 = \sum_{i=1}^{N} v_i(x_i - \mu_x)^2$$

$$\sigma_y^2 = \sum_{i=1}^{N} v_i(y_i - \mu_y)^2$$

$$\sigma_{xy} = \sum_{i=1}^{N} v_i(x_i - \mu_x)(y_i - \mu_y)$$

$$c_1 = (k_1 2^{n_b})^2$$

$$c_2 = (k_2 2^{n_b})^2$$

and where $n_b$ is the number of bits per pixel, N is the number of pixels in the window (set to N=64 for 8×8 window), v is the weighting mask, and the constants $k_1$ and $k_2$ are set to $k_1$=0.01 and $k_2$=0.03. The mean SSIM (MSSIM) is then simply defined over all M windows of the image as $$MSSIM(x, y) = \frac{1}{M}\sum_{j=1}^{M} SSIM(x, y)$$

This measure of perceptual distortion, is shown in FIGS. 11 and 12 is a more meaningful comparison than simple mean square error and is a popular tool for image quality assessments. For the processes used in the experiments demonstrated in FIGS. 11 and 12, the Dirichlet process concentration parameter was set to η=10 and the Beta process parameters were set to a=b=1.

In FIG. 11, the image reconstruction of the DLC process at layer 2 (16×16 regions) is compared to JPEG. The resulting DLC compression ratio is 50:1. To compare with JPEG at the same compression ratio, the JPEG quality factor is turned down to around 5% to be able to achieve the same compression ratio. As shown in FIG. 11, JPEG suffers from significant macroblocking artifacts, in which areas of a the image appear to be made up of small squares rather than proper detail and smooth edges, while the DLC compression nearly reproduces the original image.

FIG. 12 demonstrates the image reconstruction from a 3-layer DLC process, which corresponds to 32×32 image regions. The DLC shows graceful degradation in image quality with the MSSIM=0.7725 being only slightly worse than the quality seen at a compression ratio of 50:1 (FIG. 11) while achieving a 456:1 compression ratio. JPEG compression could not compress beyond 65:1, at which point the quality factor was 1%. Comparing the reconstruction from the DLC method at compression ratio to 456:1 in FIG. 12 to the JPEG compression ratio set to 50:1 in FIG. 11, the DLC compression method according to certain embodiments described herein is able to achieve almost 10× compression ratio at significantly less distortion. These results demonstrate the power of deep learning compression methods described herein, which achieves relatively small degradation in image quality even for very large compression ratios.

Compression methods, systems, and devices described herein are capable of compressing and decompressing digital image files at compression ratios unachievable by conventional techniques. The compressed files require significantly less storage space to store and time and bandwidth to transfer from device to device. The described compression methods, systems, and devices also allow for compression ratios comparable to conventional methods but with far less distortion to the digital image. Instead of relying on human inference into the underlying structure of digital image data, the methods systems, and devices described herein utilize machine learning, which offers a computing based learning of data structure, to learn the patterns in digital images. This offers more powerful representations of digital images that lead to better compression. The described compression methods, systems, and devices may be used to compress grayscale and color images of any size and resolution.

The invention claimed is:

1. A computer implemented method for machine learning model parameters for image compression, comprising:
    partitioning a plurality of training image files stored on a first computer memory into a first set of regions, wherein each region of the first set of regions is an array of pixel values;
    training a probabilistic learning machine on the first set of regions to generate a first set of machine learned model parameters, the first set of machine learned model parameters representing a first level of data patterns in the plurality of training image files;
    constructing a representation of each region of the first set of regions using the first set of regions and the first set of machine learned model parameters, wherein a representation of a respective region of the first set of regions has an equal number of pixel values as the respective region;
    constructing representations of the plurality of training image files by combining the representations of the regions of the first set of regions;
    partitioning the representations of the plurality of image files into a second set of regions, wherein a region of the second send of regions has a greater number of pixel values than at least one region of the first set of regions;
    training the probabilistic learning machine on the second set of regions to generate a second set of machine learned model parameters, the second set of machine learned model parameters representing a second level of data patterns in the plurality of image files, wherein the number of machine learned model parameters in the second set of machine learned model parameters is less than the number of machine learned model parameters in the first set of machine learned model parameters; and
    building the first set of machine learned model parameters and the second set of machine learned model parameters into an executable image compression application that is configured to compress an image file that is different from the training image files by transforming the image file into a compressed image file based on the first set of machine learned model parameters generated from the training image files and the second set of machine learned model parameters generated from the training image files.

2. The computer implemented method of claim 1, wherein the first set of machine learned model parameters and the second set of machine learned model parameters are used to compress and decompress a digital image file stored on a second computer memory.

3. The computer implemented method of claim 1, wherein:
    each of the image files comprises pixel values for rendering an image on a display and each of the regions in the first set of regions comprises a subset of the pixel values for rendering a corresponding region of the image on the display.

4. The computer implemented method of claim 1, wherein:
    each region in the first set of regions overlaps at least one other region in the first set of regions; and
    each region in the second set of regions overlaps at least one other region in the second set of regions.

5. The computer implemented method of claim 4, wherein each of the first set of regions comprises an M by M array of pixel values, wherein M is an integer.

6. The computer implemented method of claim 5, wherein each of the second set of regions comprises an N by N array of pixel values, wherein N is greater than M.

7. The computer implemented method of claim 1, wherein the probabilistic learning machine comprises a statistical model for estimating a structure underlying a set of training data.

8. The computer implemented method of claim 1, wherein:
    determining a first set of machine learned model parameters comprises machine learning a first union of subspaces that estimates each of the regions in the first set of regions, wherein the first set of machine learned model parameters includes basis vectors and offsets for subspaces in the first union of subspaces; and
    determining a second set of machine learned model parameters comprises machine learning a second union of subspaces that estimates each of the regions in the second set of region, wherein the second set of machine learned model parameters includes basis vectors and offsets for subspaces in the second union of subspaces.

9. The computer implemented method of claim 8, wherein:
    the first union of subspaces and the second union of subspaces are machine learned based on a Mixture of Factor Analyzers.

10. The computer implemented method of claim 8, wherein:
    a quantity and a dimension of subspaces in the first union of subspaces are determined based on the plurality of image files; and
    a quantity and a dimension of subspaces in the second union of subspaces is determined based on the representations of the plurality of image files.

11. A computer implemented method for compressing an image file, comprising:
    storing an image file having a first file size in a memory of a computer;

partitioning the image file into a first set of regions, wherein each region of the first set of regions is an array of pixel values;

constructing a representation of each region of the first set of regions using the first set of regions and a first set of machine learned model parameters, the first set of machine learned model parameters having been generated by training a probabilistic learning machine on a plurality of training image files and representing a first level of data patterns in the plurality of training image files, wherein the representation of a respective region of the first set of regions has the same total number of values as the respective region of the first set of regions;

constructing a first representation of the image file by combining the representations of the regions of the first set of regions;

partitioning the first representation of the image file into a second set of regions, wherein a region of the second send of regions has a greater number of pixel values than at least one region of the first set of regions;

constructing a representation of each region in the second set of regions using the first set of regions and a second set of machine learned model parameters, the second set of machine learned model parameters having been generated by training the probabilistic learning machine on representations of the plurality of training image files constructed from the first set of machine learned model parameters and representing a second level of data patterns in the plurality of training image files;

constructing a second representation of the image file by combining the representations of the regions of the second set of regions, wherein the second representation comprises coefficients of the machine learned model parameters in the second set of machine learned model parameters;

selecting a plurality of elements from a predetermined list of elements to represent the model parameter coefficients;

generating a compressed image file for the image file, the compressed image file comprising a plurality of indices to the plurality of elements; and storing the compressed image file in the memory, wherein the stored compressed image file has a second file size that is less than the first file size.

12. The computer implemented method of claim 11, wherein each region in the first set of regions overlaps at least one other region in the first set of regions; and
each region in the second set of regions overlaps at least one other region in the second set of regions.

13. The computer implemented method of claim 11, wherein the probabilistic learning machine comprises a statistical model for estimating a structure underlying a set of training data.

14. The computer implemented method of claim 13, wherein the statistical model comprises a Mixture of Factor Analyzers.

15. The computer implemented method of claim 11, wherein the first representation comprises coefficients of the machine learned model parameters in the first set of machine learned model parameters, and the method further comprises selecting a second plurality of elements from a second predetermined list of elements to represent the coefficients of the machine learned model parameters in the first set of machine learned model parameters, and wherein the compressed image file comprises a second plurality of indices to the second plurality of elements.

16. A computer implemented method for decompressing an image file comprising:

opening a compressed image file comprising a plurality of indices to a plurality of elements from a predetermined list of elements, wherein the predetermined list of elements is based on:
a first set of machine learned model parameters having been generated by training a probabilistic learning machine on a plurality of training image files that were partitioned into a first set of regions, each region being an array of pixel values, and that represent a first level of data patterns in the plurality of training image files, and
a second set of machine learned model parameters having been generated by training the probabilistic learning machine on representations of the plurality of training image files that were constructed from representations of the first set of regions generated using the first set of machine learned model parameters and the first set of regions, a representation of a respective region of the first set of regions having an equal number of pixel values as the respective region, and that represent a second level of data patterns in the plurality of training image files;

retrieving the plurality of elements from the predetermined list of elements based on the plurality of indices;

constructing a plurality of decompressed image regions by combining the plurality of elements with the second set of machine learned model parameters; and blending the plurality of decompressed image regions to generate a decompressed image file.

17. The computer implemented method of claim 16, wherein the probabilistic learning machine comprises a statistical model for estimating a structure underlying a set of training data.

18. The computer implemented method of claim 17, wherein the statistical model comprises a Mixture of Factor Analyzers.

19. A computer implemented method for decompressing an image file comprising:

opening a compressed image file comprising:
a first plurality of indices to a first plurality of elements from a first predetermined list of elements, wherein the first predetermined list of elements is based on a first set of machine learned model parameters having been generated by training a probabilistic learning machine on a plurality of training image files that were partitioned into a first set of regions, each region being an array of pixel values, and that represent a first level of data patterns in the plurality of training image files, and
a second plurality of indices to a second plurality of elements from a second predetermined list of elements, wherein the second predetermined list of elements is based on a second set of machine learned model parameters having been generated by training the probabilistic learning machine on representations of the plurality of training image files that were constructed from representations of the first set of regions generated using the first set of machine learned model parameters and the first set of regions, a representation of a respective region of the first set of regions having an equal number of pixel values as the respective region, and that represent a second level of data patterns in the plurality of training image files;

retrieving the first plurality of elements from the first predetermined list of elements based on the first plurality of indices;

constructing a first plurality of decompression regions by combining the first plurality of elements with the first set of machine learned model parameters;

retrieving the second plurality of elements from the second predetermined list of elements based on the second plurality of indices;

constructing a second plurality of decompressed regions by combining the second plurality of elements with the second set of machine learned model parameters and the first plurality of regions; and blending the second plurality of decompressed regions to generate a decompressed image file.

20. A system for compressing an image file comprising one or more processors, memory, and one or more applications stored in the memory that include instructions for:

partitioning a plurality of training image files into a first set of regions, wherein each region of the first set of regions is an array of pixel values;

training a probabilistic learning machine on the first set of regions to generate a first set of machine learned model parameters, the first set of machine learned model parameters representing a first level of data patterns in the plurality of training image files;

constructing a representation of each region of the first set of regions using the first set of regions and the first set of machine learned model parameters, wherein a representation of a respective region of the first set of regions has an equal number of pixel values as the respective region;

constructing representations of the plurality of training image files by combining the representations of the regions of the first set of regions;

partitioning the representations of the plurality of image files into a second set of regions, wherein a region of the second send of regions has a greater number of pixel values than at least one region of the first set of regions; and training the probabilistic learning machine on the second set of regions to generate a second set of machine learned model parameters, the second set of machine learned model parameters representing a second level of data patterns in the plurality of image files, wherein the number of machine learned model parameters in the second set of machine learned model parameters is less than the number of machine learned model parameters in the first set of machine learned model parameters; and storing an image file in the memory, the image file having a first file size;

compressing the image file by transforming the image file into a compressed image file based on the first set of machine learned model parameters generated from the training image files and the second set of machine learned model parameters generated from the training image files; and storing the compressed image file in the memory, wherein the stored compressed image file has a second file size that is less than the first file size.

21. The system of claim 20, wherein the one or more applications include instruction for decompressing the compressed image file based on the second set of machine learned model parameters.

22. A non-transitory computer readable storage medium storing one or more programs, the one or more programs comprising instructions, which when executed by an electronic device, cause the device to:

partition an image file into a first set of regions, wherein each region of the first set of regions is an array of pixel values;

construct a representation of each region of the first set of regions using the first set of regions and a first set of machine learned model parameters, the first set of machine learned model parameters having been generated by training a probabilistic learning machine on a plurality of training image files and representing a first level of data patterns in the plurality of training image files, wherein the representation of a respective region of the first set of regions has the same total number of values as the respective region of the first set of regions;

construct a first representation of the image file by combining the representations of the regions of the first set of regions;

partitioning the first representation of the image file into a second set of regions, wherein a region of the second send of regions has a greater number of pixel values than at least one region of the first set of regions;

construct a representation of each region in the second set of regions using the first set of regions and a second set of machine learned model parameters, the second set of machine learned model parameters having been generated by training the probabilistic learning machine on representations of the plurality of training image files constructed from the first set of machine learned model parameters and representing a second level of data patterns in the plurality of training image files;

construct a second representation of the image file by combining the representations of the regions of the second set of regions, wherein the second representation comprises coefficients of the machine learned model parameters in the second set of machine learned model parameters;

select a plurality of elements from a predetermined list of elements to represent the model parameter coefficients; and generate a compressed image file for the image file, the compressed image file comprising a plurality of indices to the plurality of elements, wherein the compressed image file has a smaller file size than the image file.

* * * * *